United States Patent
Mazur

(10) Patent No.: US 6,242,527 B1
(45) Date of Patent: Jun. 5, 2001

(54) SOLID SURFACE MATERIALS DERIVED FROM AQUEOUS LATEX DISPERSIONS OF THERMOPLASTIC POLYMERS

(75) Inventor: Stephen Mazur, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/204,445

(22) Filed: Dec. 2, 1998

(51) Int. Cl.$^7$ .............. C08K 3/26; C08K 3/22; C08K 3/08; C08K 3/34; C08L 33/04; C08L 33/08; C08L 33/10; C08L 33/12
(52) U.S. Cl. .............. 524/559; 524/425; 524/430; 524/441; 524/442; 524/560
(58) Field of Search .............. 516/79, 99, 110, 516/111, 112; 524/404, 425, 430, 441, 442, 559, 560

(56) References Cited

U.S. PATENT DOCUMENTS

| | | | |
|---|---|---|---|
| 3,904,795 | * 9/1975 | Mercurio | 427/375 |
| 3,966,669 | * 6/1976 | Wolfe | 523/171 |
| 4,083,824 | 4/1978 | Harris | 260/42.29 |
| 4,097,430 | * 6/1978 | Phillips | 524/43 |
| 4,455,398 | 6/1984 | Budich et al. | 523/220 |
| 4,492,780 | * 1/1985 | Zimmerschied et al. | 524/45 |
| 4,508,761 | 4/1985 | Miyoshi et al. | 427/221 |
| 4,528,227 | 7/1985 | Frechtmann | 428/49 |
| 4,678,819 | 7/1987 | Sasaki et al. | 523/171 |
| 4,794,139 | * 12/1988 | Braden et al. | 524/117 |
| 4,857,111 | * 8/1989 | Haubennestel et al. | 106/504 |
| 4,886,839 | 12/1989 | Dallavia, Jr. et al. | 521/124 |
| 4,994,312 | * 2/1991 | Maier et al. | 428/36.5 |
| 5,049,594 | 9/1991 | Jeffs | 523/205 |
| 5,055,324 | * 10/1991 | Stecker | 427/281 |
| 5,487,555 | 1/1996 | Koch et al. | 280/403 |
| 5,521,243 | * 5/1996 | Minghetti et al. | 524/437 |
| 5,567,745 | 10/1996 | Minghetti et al. | 523/202 |
| 5,610,215 | * 3/1997 | Nonweiler et al. | 524/376 |
| 5,725,656 | 3/1998 | Shimanovich et al. | 106/778 |
| 5,770,760 | * 6/1998 | Robinson et al. | 560/221 |
| 5,814,685 | * 9/1998 | Satake et al. | 523/201 |
| 6,001,913 | * 12/1999 | Thames et al. | 524/398 |

FOREIGN PATENT DOCUMENTS

| | | | |
|---|---|---|---|
| 4402432 | 8/1995 | (DE) | C04B/32/00 |
| 0 085 778 A1 | 12/1982 | (EP) . | |
| 0 292 233 | 11/1988 | (EP) | C08K/9/04 |
| 0 652 252 A1 | 11/1994 | (EP) . | |
| 77039843 | 11/1973 | (JP) | B44C/1/20 |
| 63-265908 | 11/1988 | (JP) | C08F/292/00 |
| 63-265907 | 11/1988 | (JP) | C08F/292/00 |

OTHER PUBLICATIONS

Flory, Paul J.; Principles of Polymer Chemistry, Cornell University Press, Ithaca (p. 207), 1953.*

* cited by examiner

Primary Examiner—Vasu Jagannathan
Assistant Examiner—Callie Shosho

(57) ABSTRACT

A thermoplastic solid surface material derived from a thermoplastic latex co-dispersion and downstream intermediates, including (a) aqueous thixotropic slips; (b) polymeric composite flakes; (c) composite powders; (d) composite pastes; and (e) preformed composite pieces

11 Claims, 15 Drawing Sheets

(3 of 15 Drawing Sheet(s) Filed in Color)

SOLID SURFACE MATERIALS DERIVED FROM AQUEOUS LATEX DISPERSIONS OF THERMOPLASTIC POLYMERS

BACKGROUND OF THE INVENTION

1. Field of the Invention

This invention relates to aqueous latex compositions that are useful in the thermoplastic fabrication of solid surface materials, solid surface materials from such compositions, and solid surface materials having unique decorative patterns.

2. Description of the Related Art

Solid surface materials are essentially non-porous composites of finely divided mineral fillers dispersed in an organic polymer matrix. Examples of commonly used fillers include calcium carbonate, silica, and alumina. Examples of commonly used polymeric materials include acrylic, polyester, and epoxy resins. Most solid surface materials are manufactured by thermoset processing, such as sheet casting, cell casting or bulk molding. The decorative qualities of such products are greatly enhanced by incorporating pigments and colored particles in patterns such that the composite resembles natural stone. The range of patterns commercially available is constrained by the intermediates and methods currently used in the fabrication of such materials.

Solid surface materials in their various applications serve both functional and decorative purposes. Since their utility is enhanced by incorporating various attractive and/or unique decorative patterns, such patterns constitute intrinsically useful properties which differentiate one product from another. The same principle applies to naturally occurring materials such as wood or stone whose utility, for example in furniture construction, is enhanced by certain naturally occurring patterns, e.g., grain, color variations, veins, strata, inclusions, and others. Commercially manufactured solid surface materials often incorporate decorative patterns intended to imitate or resemble the naturally occurring patterns in granite or marble. However, due to limitations of feasibility and/or practicality, certain decorative patterns and/or categories of decorative patterns have not previously been incorporated in solid surface materials.

In addition, it has not been possible to form compression molded articles with acceptable physical properties using conventional mineral filled thermoset polymeric particles. These conventional particles are generally made from filled thermoset polymeric material which is ground into small particles. The polymeric material is crosslinked and consequently, during compression molding the polymer chains cannot diffuse between domains to create a strong interface. In addition, the grinding process results in uncovered filler exposed on the surface of the ground particles. In general, compression molding of such ground polymeric particles results in only a weak interface between particles and the resulting article is mechanically weaker than the articles made by conventional thermoset techniques.

Decorative patterns have been previously achieved in traditional thermoset fabrication primarily by the following three methods:

(i) Monochromatic pieces of a pre-existing solid surface product is mechanically ground to produce irregularly shaped colored particles which are then combined with other ingredients in a new thermoset formulation. Casting or molding, and curing the reaction combination produces a solid surface material in which colored inclusions of irregular shapes and sizes are surrounded by, and embedded in a continuous matrix of a different color.

(ii) During casting of a thermoset reaction combination, a second reaction combination of a different color is added in such a way that the two only intermix to a limited degree. In the resulting solid surface material, the different colored domains have smooth shapes and are separated by regions with continuous color variation.

(iii) Different colored solid surface products are cut or machined into various shapes which are then joined by means of adhesive to create multi-colored inlayed patterns or designs.

Using these traditional thermoset methods it is not possible to produce certain categories of decorative patterns which occur in natural stone. Moreover, the inclusions incorporated in solid surface products produced by method (i) are limited to sizes less than about 20 mm, more generally less than 5 mm, and must constitute less than about 80% of the thermoset reaction mix, more generally less than 20%.

SUMMARY OF THE INVENTION

One aspect of the invention is directed to a thermoplastic solid surface material derived from a latex co-dispersion composition comprising:

(a) about 20–60% by weight, based on the weight of solids, of at least one thermoplastic polymer having a $T_g$ greater than about 60° C., the at least one thermoplastic polymer in the form of colloidal particles;

(b) about 20–80% by weight, based on the weight of solids, of mineral filler particles;

(c) up to about 5% by weight, based on the weight of solids, of decorative particles;

(d) up to about 50% by weight, based on the weight of solids, of polymeric particles selected from filled polymeric particles, unfilled polymeric particles, and combinations thereof.

A second aspect of the invention is directed to composite intermediates derived from the latex co-dispersion composition described above, and processes for making the composite intermediates. These intermediates have physical forms including (a) aqueous thixotropic slips; (b) polymeric composite flakes; (c) composite powders; (d) composite pastes; and (e) preformed composite pieces.

A third aspect of the invention is directed to decorative patterns in a solid surface material derived from the above-described latex co-disperion composition. These decorative patterns include veined patterns, tesselated patterns, geometric inclusions, patterns of stratified domains, and combinations of such.

A fourth aspect of the invention is directed to a thermoplastic monolithic structure having at least a first surface having a first pattern, at least a second surface having a second pattern, the first pattern being visibly different from the second pattern, a plurality of first planes parallel to the first surface, a plurality of second planes parallel to the second surface, wherein the first pattern is reproduced in the first planes, the second pattern is reproduced in the second planes, such that the first pattern and the second pattern are retainable after the structure undergoes machining, grinding, polishing, cutting, and combinations thereof.

This invention is directed to solid surface materials having certain unique decorative patterns and categories of patterns not previously represented. The present invention makes available, via compression molding of latex-derived thermoplastic intermediates, solid surface materials incorporating certain previously unrepresented decorative patterns and categories of decorative patterns. Accordingly, such products constitute novel and useful improvements over the existing art.

Unless otherwise stated, the percentages used herein refer to weight percentages.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE PREFERRED EMBODIMENTS

Figure 1:
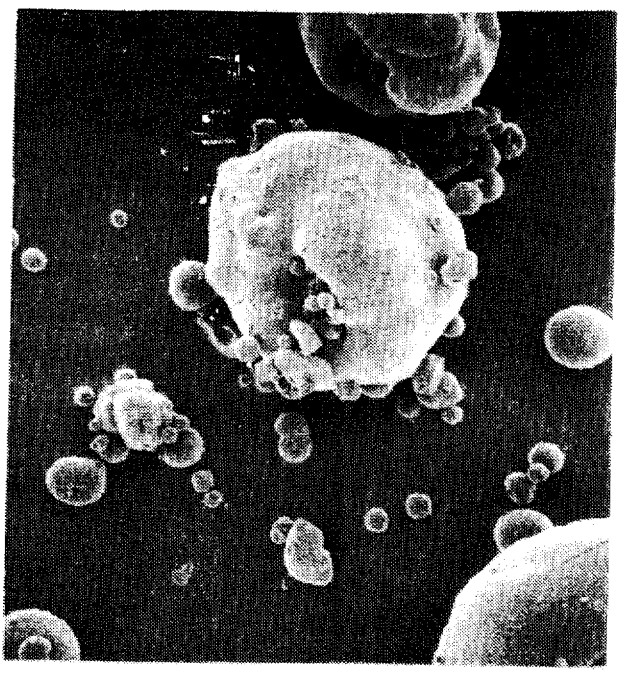
FIG. 1 is a scanning electron micrograph of a spray-dried composite powder in accordance to the invention at 500× magnification.

One aspect of the invention is directed to a process for making solid surface materials, from a thermoplastic latex co-dispersion intermediate. Depending upon the desired decorative pattern in the solid surface material, this process may also involve one or more of the following downstream composite intermediates derived from the thermoplastic latex co-dispersion (also referred to as "latex-derived intermediates"): (a) aqueous thixotropic slips; (b) polymeric composite flakes; (c) composite powders; (d) composite pastes; and (e) preformed composite pieces.

Another aspect of the invention is directed to the high-Tg thermoplastic latex co-dispersion intermediate, the downstream composite intermediates (a) through (e) listed above; and the process for making each of these intermediates.

Yet another aspect of the invention is directed to decorative patterns in solid surface materials made using the intermediates of the present invention.

By "latex co-dispersion" is meant an aqueous dispersion of polymer colloidal particles smaller than about about 2 microns, preferably 1 micron. Preferably, a charge stabilized aqueous dispersion wherein the stabilizing mechanism is a mutual repulsion of like charges on the particles. Charge stabilized aqueous dispersions are described in Russel, W. B. et al., Colloidal Dispersions, Chapter 8 (titled "Electrostatic Stabilization") (Cambridge University Press, 1989). Further, the co-dispersion is non film-forming.

Definitions

By "average mineral filler particle size" it is meant the weight average particle size, as measured by an instrument called a Coulter Multisizer, available from Beckman-Coulter (Miami, Fla.).

The term "drying" refers to the removing of water from the co-dispersion so that the co-dispersion's water content is less than 0.5 wt %, based upon the weight of the solids, preferably less than 0.2 wt %.

By "non film-forming" it is meant that when the composition is dried, portions of the material do not coalesce and/or form a continuous cohesive film.

"Preformed composite pieces" refers to a cohesive piece that is not fully densified.

By "solid surface materials" it is meant non-plasticized materials that are essentially non-porous composites of finely divided mineral fillers dispersed in an organic polymer matrix to form a self-supporting object that can be post-fabricated and handled without a supporting substrate.

By "shear thinning" is meant that the viscosity decreases with increasing shear stress.

By "thixotropic" is meant that the viscosity decreases upon application of a shear stress, and that a measurable time is required for the viscosity to increase when the shear force is removed.

By "yield stress" is meant a minimum (non-zero) stress value, below which no flow is observed.

Thermoplastic Latex Co-Dispersions

The co-dispersion intermediate of the present invention is a latex dispersion of at least one thermoplastic polymer and a filler. The co-dispersion intermediate is non-film forming.

Polymers useful in the present invention form latex co-dispersions that dry efficiently in a relatively thick specimen, such as, for example, one-inch thick slabs. The useful polymers form co-dispersions that are non-film forming at the drying temperature under atmospheric pressure. In addition, the final product derived from the latex co-dispersion is a rigid solid at the use temperature (generally room temperature).

Useful polymers include both amorphous and semi-crystalline thermoplastic polymers. In general, suitable amorphous and/or semi-crystalline polymers have ahigh Tg, such as a Tg of greater than about 60° C. Preferably, the Tg is greater than 80° C. more preferably, greater than 100° C. The weight average molecular weight of such high-Tg polymers are generally greater than about 300,000; preferably greater than about 500,000. Examples of suitable thermoplastic polymers include homopolymers and copolymers made from acrylic and methacrylic acid; acrylate and methacrylate esters; styrene and substituted styrenes; vinyl halides; fluorinated monomers, such as tetrafluoroethylene; vinylidene halides; vinyl esters; vinyl ethers and fluorovinyl ethers. In addition, dispersions of polymers such as polyamides, polyesters, polyurethanes, epoxies and siloxanes, as well as copolymers, can be used. Combinations of polymers can also be used.

Preferred polymers are acrylics, by which is meant homopolymers and copolymers of acrylic or methacrylic acid, referred to collectively as (meth)acrylic acid, or their esters, referred to collectively as (meth)acrylates. Most preferred polymers are poly(methyl methacrylate), referred to as PMMA, and its copolymers with other (meth)acrylates.

Latex co-dispersions of colloidal particles having a particle size of about 2 microns or less, preferably 1 micron or less, can be formed by well-known emulsion polymerization techniques. Such techniques have been described in, for example, S. R. Sandler & W. Karo, "Polymer Synthesis," Vol. 1, chapter 10 (Academic Press, 1974); Blackley, "Emulsion Polymerisation (Applied Science Publishers, 1975); Sanderson, U.S. Pat. No. 3,0332,521; and Hochberg, U.S. Pat. No. 3,895,082. The colloidal particles have a particle size diameter of 2 microns or less; preferably 0.5 microns or less. It is also possible to prepare certain emulsions by synthesizing the polymer in a solvent and inverting into an aqueous dispersion.

The thermoplastic latex co-dispersion includes a particulate filler. In general this is a mineral filler that increases the hardness, stiffness or strength of the final article relative to the pure polymer or combination of pure polymers. It will be understood, that in addition, the mineral filler can provide other attributes to the final article. For example, it can provide other functional properties, such as flame retardance, or it may serve a decorative purpose and modify the aesthetics. Some representative mineral fillers include alumina, alumina trihydrate (ATH), alumina monohydrate, Bayer hydrate, silica including sand or glass, glass spheres, magnesium hydroxide, magnesium oxide, calcium carbonate, barium carbonate, aluminosilicates, borosilicates, and ceramic particles. Furthermore, the mineral fillers can be optionally coat-treated with coupling agents, such as silane (meth)acrylate available from OSI Specialties (Friendly, W.Va.) as Silane Methacrylate A-174. The mineral filler is present in the form of small particles, with an average particle size in the range of from about 5–500 microns.

The nature of the mineral filler particles, in particular, the refractive index, has a pronounced effect on the aesthetics of the final article. When the refractive index of the filler is closely matched to that of the latex polymer, the resulting final article has a translucent appearance. As the refractive index deviates from that of the latex polymer, the resulting appearance is more opaque. Because the index of refraction of ATH is close to that of PMMA, ATH is often a preferred filler for PMMA systems.

The co-dispersion can optionally include decorative fillers. Such decorative fillers, although they may have a minor effect on physical properties, are present primarily for aesthetic reasons. In some cases, decorative fillers which are difficult to disperse in thermoset formulations can be included in the stable co-dispersion of the invention. Examples of suitable decorative fillers include pigments and other water-insoluble colorants; reflective flakes; metal particles; rocks; colored glass; colored sand of various sizes; wood products, such as fibers, pellets and powders; and others. The particle size will vary with the nature of the decorative filler, and can be as large as several centimeters.

The co-dispersion can also optionally include polymeric particles in an amount of up to about 50% by weight, based on the weight of solids. The polymeric particles may be filled or unfilled polymeric particles. The polymeric particles can be thermoset, thermoplastic, and combinations of such; they may be colored or colorless. Examples of suitable polymeric particles include acrylics that are unfilled, or filled with mineral fillers and/or pigments, including mineral filled acrylic particles that have been ground from an acrylic product (such as acrylic sheets); polymeric beads of styrene, ABS (acrylonitrile-butadiene-stryrene), and a wide variety of others. Suitable polymeric particles also include those derived a thixotropic slip containing no mineral filler, as illustrated in the examples.

The co-dispersion can optionally include functional additives. Such additives impart additional special properties to the final article for specific applications. Examples of such functional additives include flame retardants, antibacterial agents, and others known in the art. The functional additives can be a solid or a liquid, dispersed or dissolved. The amount and physical form of functional additives should be such that the functional properties are imparted to the final article.

Other materials may be present in the co-dispersion, such as water-soluble colorants such as dyes, surfactants and by-products of the polymerization reaction(s). These can be present so long as they do not interfere with further processing of the co-dispersion. Materials, such as plasticizers, which can cause the co-dispersion to coalesce upon drying, is preferably avoided, or at least minimized. The final co-dispersion composition should be non-film forming.

The co-dispersions are conveniently prepared by first forming an aqueous latex dispersion of the high-Tg thermoplastic material and then adding the remaining components. In some cases, the mineral filler can be added prior to polymerization. The co-dispersions include about 20–60% by weight, preferably about 30–50 wt %, based on the weight of solids, of latex polymer; about 20–80 wt %, preferably about 50–75 wt %, based on the weight of solids, of mineral fillers; up to 5 wt %, based on the weight of solids, of decorative particles; and up to 50 wt %, preferably up to about 40 wt %, based on the weight of solids, of polymeric particles. It is understood that some part of the mineral fillers may be incorporated into the polymeric fillers. It is further understood that the total mineral filler content is the sum of that which is part of the filled polymeric particles and that which is added independently.

The thermoplastic latex co-dispersion can be used with modification to form other intermediates and final products. Examples of downstream intermediates include: (a) aqueous thixotropic slips; (b) polymeric composite flakes; (c) composite powders; (d) composite pastes; and (e) preformed composite pieces.

In general, the mineral filler is more dense than the polymer latex and tends to sediment. This can lead to non-uniform final products. Where filler sedimentation is undesirable, the co-dispersion can be converted to downstream wet intermediates, such as intermediates (a) and (d) described above.

(a) Aqueous Thixotropic Slips

Aqueous thixotropic slips are commonly dispersions that exhibit a low viscosity under steady shear forces, such as mixing, but when shearing is interrupted, the viscosity increases dramatically with time. Following high shear, it requires a finite relaxation time to recover the low-shear properties. Thus after shearing, the material can be poured, but upon resting it sets up again.

In the thixotropic slips of the invention, there is a finite yield stress observable at room temperature such that there is no flow, or sedimentation at applied stresses less than the yield stress. For Bingham fluids or plastics, shear stress and yield stress are related in accordance to Equation (1) below:

$$\sigma = \sigma_y + \eta_\infty \frac{d\gamma}{dt}$$ Equation (1)

where $\sigma$ is applied shear stress, $\eta\infty$ is infinite shear viscosity, $$\frac{d\gamma}{dt}$$

is strain rate, and $\sigma_y$ is the yield stress. By measuring shear stress as a function of strain rate and extrapolating the data to $$\frac{d\gamma}{dt} = 0,$$

the yield stress can be determined.

In practice, yield stress is generally not measured. Instead, establishment of adequate yield stress is identified by various phenomena that can be observed. Such phenomena include, for example, the ability to support a spatula in an upright position without tipping; the ability to coat a spatula without dripping; the ability to form a "peak" or wave which does not spontaneously level under the influence of gravity. Furthermore, such materials do not exhibit sedimentation upon standing for several days, preferably several weeks.

Many additives are known to produce thixotropy, including fumed metallic oxides, water-soluble polymers, associative thickeners, clays, or alkali swellable micro-gels. It is also known to induce coagulation or secondary flocculation of the colloid itself, as described in, for example, G. V. Franks & F. F. Lange, *J. Amer. Ceram. Soc.*, 79, 3161 (1996).

In many cases, the choice of thickener depends on the desired final use of the material. It is generally desirable to avoid materials which will cause water sensitivity, discoloration, or poor mechanical properties. It is also generally desirable to avoid materials which must be present in very large quantities in order to be effective. For charge stabilized latex systems, it has been found that salts can function as effective thickening agents. Preferred thickening agents are not only viscosity enhancing agents, but also provide yield stress. Examples of useful thickening agents include ammonium salts of weak volatile acids, preferably ammonium carbonate, ammonium acetate, and combinations thereof. These salts have the additional advantage that upon drying between 50 and 115° C., they evaporate completely and form non-noxious volatiles when present in small amounts. Under the preferred conditions, less than 1% by weight, based on the weight of the solids, is thickening agent.

(b) Polymeric Composite Flakes

When a layer of thixotropic slip is coated on a smooth surface and allowed to dry, it is non film-forming. Rather, it shrinks and cracks, forming discrete, irregularly shaped flakes. This is true under atmospheric pressure at essentially any environment or process temperature.

These flakes are generally porous and quite fragile. The lateral dimensions of the flakes vary with the coating thickness, slip composition, including percent solids, and drying conditions. For a given set of conditions the flake sizes are generally fairly uniform. Depending on thickness, the flakes can have dimensions ranging from about 0.2 cm to 15 cm in the longest direction. The flakes can range about 0.5 mm to 6 cm in thickness.

The polymeric composite flakes can be prepared by any known coating technique, including blade coating, extrusion coating and the like. The coating process can be batch or continuous, such as by using a drum or belt drier. Drying can take place at room temperature or with heating. In general, temperatures of 130° C. or less are used.

The resulting polymeric composite flakes, as formed, are quite fragile and require careful handling. As further discussed below, the polymeric composite flakes of the invention can be used to form a non-porous coherent object under the application of temperature above the Tg, and a pressure greater than 100 psi.

Typically the polymeric composite flakes of the invention have a composition including: about 20–60 wt %, of at least one suitable latex thermoplastic polymer; about 20–80 wt % of mineral filler, and optionally up to about 5 wt % decorative particles and up to about 50 wt % polymeric particles. All weight percent are based upon the weight of the flake. The preferred composite flake, or any dry intermediate (b), (c), or (e) comprises about 30–50% by weight, based on the weight of solids, of the thermoplastic polymer; about 50–75% by weight, based on the weight of solids, of the mineral filler; optionally up to about 5% by weight, based on the weight of the solids, of decorative fillers, and optionally, up to about 50% by weight, based on the weight of solids, of the polymeric particles.

If it is desired to have the polymeric composite flakes retain their shape, as for the processing described below, they can be heated for a few minutes at a temperature above the $T_g$. This results in partial densification of the material so that it will withstand normal handling but is still thermoplastic and moldable. For PMMA systems, heating at about 140° C. is effective.

(c) Composite Powders

Composite powders can be made from the thermoplastic latex co-dispersion or downstream composite intermediates. Such composite powders typically are particulates wherein each filler particle is essentially surrounded by smaller colloidal polymer particles. Moreover, the composite powders of the present invention are particulates that include an amount of high-Tg thermoplastic polymeric material that is more than about 10 percent by weight, preferably more than 30 percent by weight, based upon the weight of the composite powder.

For example, polymeric composite flakes can be reduced to powder by grinding or crushing. This can be accomplished simply by shaking the particles in a container such as a wire mesh sieve or grinding in a mill, such as, for example, hammer mill, ball mill, vibratory mill, or roller mill. Such powders are referred to herein as "flake composite powder." Typically, the flake composite powder will have particles in the size range from about 1 micron to 100 microns.

Composite flakes can be conveniently prepared by drum drying the thixotropic slip. Consequently, flake powders can be made by the processes described above. Drum drying is a well-known technique which has been described in, for example, Bulletin D0981 "Buflovak Dryers" by Buffalo Technologies Corp. (Buffalo, N.Y.).

An advantage of making composite powders from the composite flakes is that the processing requires less energy than grinding a fully consolidated solid surface material.

It is also possible to make composite powders from the aqueous co-dispersions, using known techniques such as spray drying, thermal evaporation and freeze drying.

Figure 2:
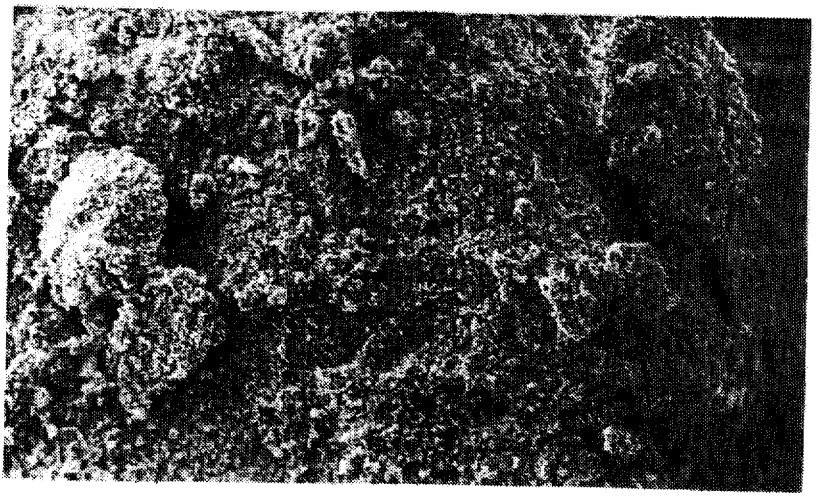
FIG. 2 is a scanning electron micrograph of a flake powder in accordance to the invention at 5,000× magnification.
Figure 3:
FIG. 3 is a scanning electron micrograph of ground particles derived from a comparative commercial mineral-filled solid surface material at 5,000× magnification.

FIG. 1 shows a scanning electron micrograph of composite powder particles made of 63 wt % ATH coated with 37 wt % PMMA, by spray-drying at temperatures well above the glass transition temperature of PMMA. The micrograph shows that the mineral filler particles are embedded in a fully consolidated, roughly spherical mass of PMMA. FIG. 2 shows a scanning electron micrograph of flake composite powders, made of 63 wt % ATH coated with 37 wt % PMMA. The surface of the mineral filler is seen to be covered by a layer of unconsolidated colloidal particles. X-ray fluorescence microanalysis reveals that virtually no bare mineral surfaces are present in the micrograph. FIG. 3 is a scanning electron micrograph of a powder made from grinding a commercial thermoset filled acrylic solid surface material, containing 63 wt % ATH and 37 wt % of a cross-linked PMMA. X-ray fluorescence microanalysis revealed that the tabular shaped object in the micrograph is a bare ATH particle. The tabular shaped object in the micrograph was a typical feature of the sample.

(d) Composite Pastes

It is also possible to form composite pastes from the polymeric latex co-dispersion of the invention. This is accomplished by adding composite powders of the invention to either the composite polymeric latex co-dispersion or to the aqueous thixotropic slip of the invention to form materials of very high solids content. The composite pastes are generally at least 70% solids, by weight; preferably, greater than 80% solids, based upon the weight of the paste.

The composite pastes can be extruded and cut to form small shaped pieces. Small pieces, generally less than about 2 cm in the widest dimension, can be dried without significant cracking. These pieces can then be used alone or with other materials, including composite powders, polymeric composite flakes and combinations thereof, to form shaped articles by compression molding, using the temperature and pressure conditions discussed above. Any minor cracks which may have formed in the pieces during drying are healed in the molding step.

The composite pastes can also be extruded in specific patterns, such as letters, symbols or other designs. These can be used with other polymeric flakes and/or polymeric powders of the invention and compression molded as described below.

(e) Preformed Composite Pieces

Preferably, preformed composite pieces have densities of from about 50% up to 99% of full density.

Preformed composite pieces can be derived from a variety of composite intermediates. For example, small shaped pieces can be made by placing an amount of aqueous thixotropic slip in a mold frame and allowing it to dry or pressing a mold frame into a layer of aqueous thixotropic slip and allowing the shaped pieces to dry, or cutting/scoring a layer of slip. Small shaped pieces can also be made by placing an amount of composite paste in a mold frame and drying the shaped piece. One way of minimizing the number of cracks in the shaped particles is to use high solids content aqueous thixotropic slips.

As discussed above, a thick composite paste may also be extruded into a small shaped piece. To facilitate handling, the dried shaped piece may be further heated under modest pressure (for example less than about 100 psi (7 kg/cm$^2$)). Depending upon the composition, rheology and thickness of the layer formed by a thick composite paste or an aqueous thixotropic slip, cracks form upon drying. Therefore, shape pieces smaller than the natural crack pattern can be formed from these wet intermediates, such as composite pastes or aqueous thixotropic slips.

Alternatively, preformed composite pieces can be derived from composite powders and/or composite flakes (collectively referred to as "dry composite intermediates") by placing the composite powders or composite flakes into a shaped receptacle or container and compressing or consolidating under modest pressure (for example less than about 100 psi) and elevated temperature (above the Tg). In contrast to the preformed pieces made from wet composite intermediates, there is no size limitation to the preformed composite pieces that can be derived from the dry composite intermediates.

Of course smaller shaped parts can also be extracted (e.g., cut, chiselled, milled, routed, bored or machined) from larger pre-formed porous composite parts.

If it is desired to have the polymeric preformed composite pieces retain their shape, as for the processing described below, they can be heated for a few minutes at a temperature above the $T_g$. This results in partial densification of the material so that it will withstand normal handling but is still thermoplastic and moldable. For PMMA systems, heating at about 140° C. is effective.

Molded Article

Molded articles can be formed from any one or a combination of the above-described dry downstream composite intermediates (i.e., intermediates (b), (c) and (e)) by compression molding. These intermediates are capable of coalescing to form a non-porous coherent object under the application of temperatures above the higher of the amorphous Tg of the amorphous polymer, or the semi-crystalline Tm of the semi-crystalline polymer, depending upon the type of polymer used, under suitable pressures. Mazur, Stephen, *Polymer Powder Technology*, Chapter 8 ("Coalescence of Polymer Particles") (John Wiley & Sons, Chichester 1996).

Customarily, thermoplastic polymers are blended with mineral fillers by melt-processing methods, such as melt extrusion blending. Similarly, the resulting intermediates (e.g., pellets) are fabricated into final products by methods such as melt extrusion or melt injection molding. However, certain melt-processing methods such as melt-extrusion and injection molding are not feasible for thermoplastic polymers having too high a melt viscosity. Melt viscosity depends upon the molecular weight (MW) and glass transition temperature (Tg) of the thermoplastic polymer, as well as the processing temperature (T), as described for example in Van Krevelen, *Properties of Polymer* 462–474 (3$^{rd}$ Ed., Elsevier Science BV, 1990). Another practical limitation for melt-processing a material is that the processing temperature (T) should not exceed the temperature at which any of the ingredients decompose.

For example, the temperature limitation for processing an ATH-filled PMMA material is determined by the decomposition of ATH, occurs at approximately 190° C. At the same time, it is desirable for the molecular weight of the PMMA polymer to exceed 300,000 to achieve optimal mechanical properties. The melt viscosity of PMMA having MW of 300,000 at 190° C. can be estimated to exceed 1 million Pa-s (Pascal-seconds) (as taught by the Van Krevelen reference, pages 462–474). This PMMA viscosity alone makes the material impractical to process by melt-extrusion or injection molding. The presence of the ATH filler further increases the viscosity of the material.

Therefore, conventional melt-extrusion and injection molding methods are impractical for processing certain thermoplastic polymers. On the other hand, since compression molding and ram extrusion require much less melt flow, the range of materials that can be processed is broader than those that can be processed by melt-extrusion and/or injection molding.

An additional advantage of the processes of the invention is that they fabricate intermediates and products from thermoplastic polymers having MW that is too high to permit melt-extrusion or injection molding.

Compression molding generally employs a vertical, hydraulically operated press which has two platens, one fixed and one moving. The mold halves may be fastened to the platens. One or more of the dry downstream composite intermediates can be placed into the mold cavity, which may be preheated. The mold is then closed with application of the appropriate pressure and temperature. At the end of the molding cycle, the mold is opened hydraulically and the molded part is removed. The mold design may also consist of a cavity with a plunger.

In ram extrusion, a powder is continuously compressed and forced through a heated cylinder under pressure.

Useful compression molding temperatures, and similarly useful ram extrusion heating temperatures, are dependent on the nature of the polymeric material and the filler. As a lower limit, the temperature should be greater than the amorphous Tg of the amorphous polymer, or the semi-crystalline Tm of the semi-crystalline polymer, depending upon the type of polymer used. When combinations of polymers are used, the material should be heated above the highest amorphous Tg and semi-crystalline Tm. As an upper limit, the temperature should not be so great as to degrade or discolor either the polymer(s) or the filler(s). For acrylic systems, a temperature in the range of about 60–190° C. is generally effective, depending on the $T_g$ of the polymer(s). The pressure is generally in the range of about 200–1000 psi (14–70 kg/cm$^2$); preferably 300–800 psi (21–56 kg/cm$^2$).

Figure 4A:
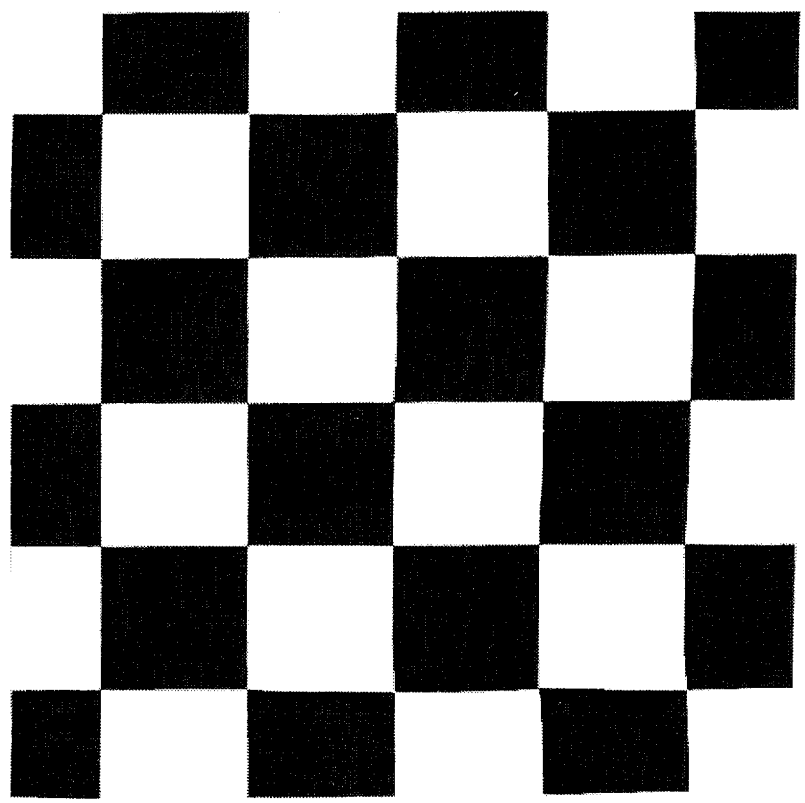
FIG. 4A is a black and white photograph of a first surface of a solid surface material having a tessellated (checkerboard) pattern.
Figure 4B:
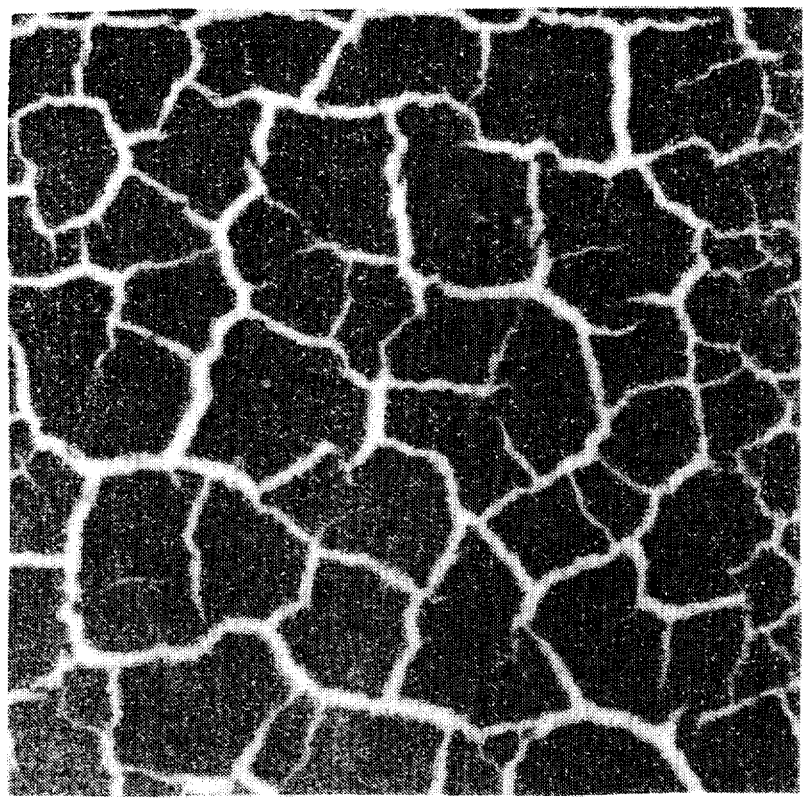
FIG. 4B is a black and white photograph of a second surface of the solid surface material of FIG. 4A having a mud-cracked pattern in which the "cracks" are filled with a contrasting color.
Figure 5:
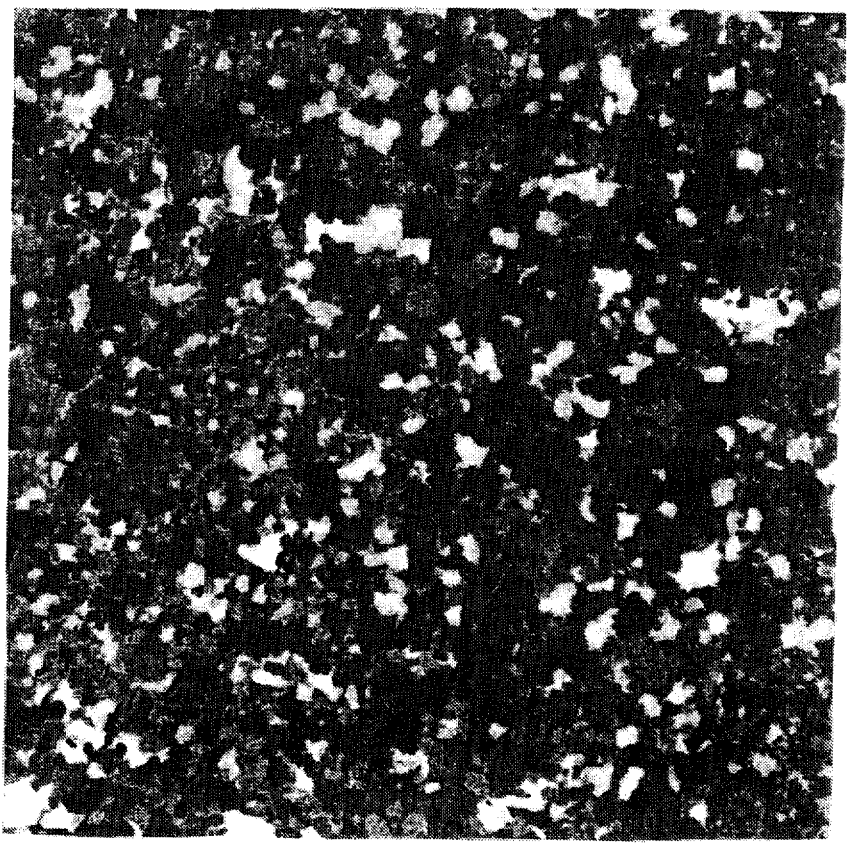
FIG. 5 is a color photograph of a surface of a solid surface material having a mosaic pattern.
Figure 6:
FIG. 6 is a black and white photograph of a surface of a solid surface material having a pattern of stratified domains.

The type and amount of fillers used may affect the physical properties of the molded article. Unexpectedly, the resulting molded articles can have physical properties very similar to those of analogous mineral-filled polymeric articles which are made by conventional thermoset techniques, such as, sheet or cell casting, or bulk molding. When the composite powders of the invention are used, the material can be compression molded into shapes. When combinations of composite flakes of various colors and/or sizes, or combinations of composite flakes and composite powders are used, interesting patterns can be developed. For example, an aqueous thixotropic slip can be coated onto a flat substrate and allowed to dry with cracking. The result is similar in appearance to dried, cracked mud. The open spaces or "mudcracks," can then be filled in with a powder of a contrasting color. To the composite powders can be added other contrasting particulate material, such as metal powders or reflecting materials. This results in a pattern in which one color or combination of colors is outlined by materials of a contrasting appearance, as shown in FIG. 4B. When flakes of different colors are used, a mosaic pattern can be developed, as shown in FIG. 5. Multi-layer flakes can form a pattern of stratified domains, as shown in FIG. 6. Shaped polymeric flakes can be used in combination with other flakes and/or polymeric powders of the invention to produce other distinctive patterns. All of the patterns are distinctively different from the conventional terrazzo type pattern often found in solid surface materials, in which one color is embedded in a matrix of another.

Figure 7:
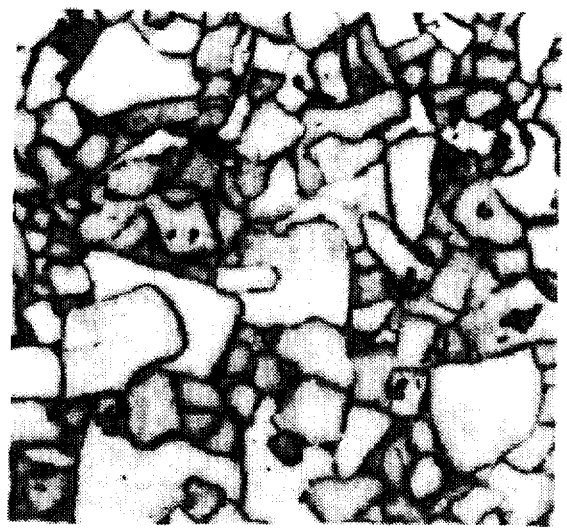
FIG. 7 is a black and white photograph of a solid surface material having a tessellated pattern having sharply outlined domains and made from coated composite flakes.

It is also possible to coat particles or flakes with another thermoplastic co-dispersion or aqueous thixotropic slip. The coating can be a single layer or multiple layers and can be accomplished by conventional coating techniques such as spraying, painting or tumbling. When coated materials are dried and molded, the coated particles or flakes appear in the product as sharply outlined domains, as shown in FIG. 7. Frequently, a thin layer of the outer surface of the molded article is removed by grinding in order to best see the effect.

Figure 14A:
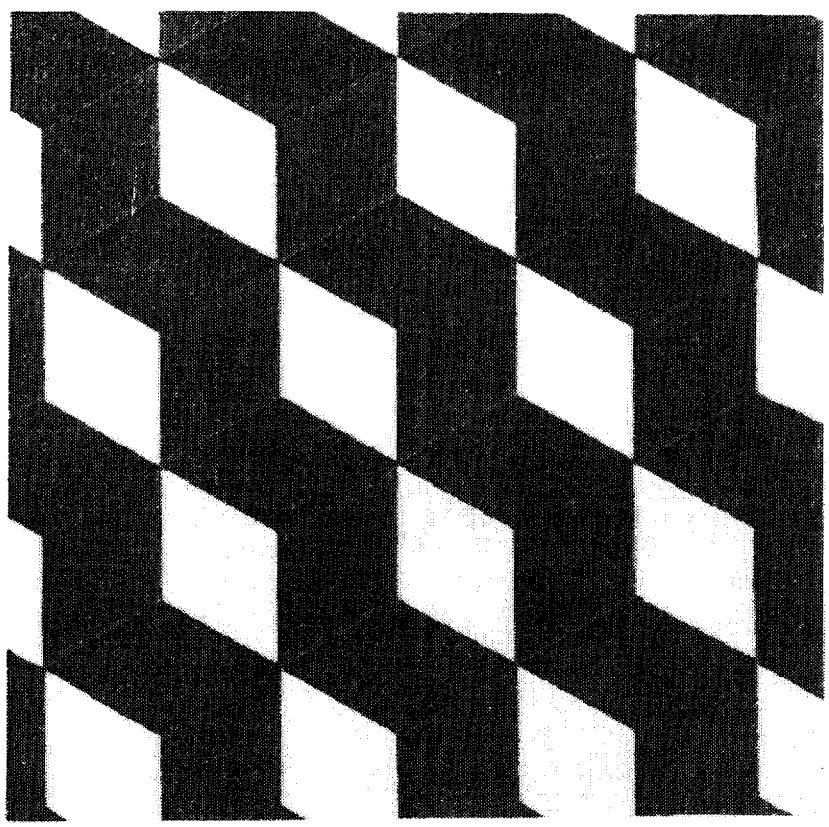
FIG. 14A is a color photograph of a first surface of a solid surface material having a geometric tessellated pattern.
Figure 14B:
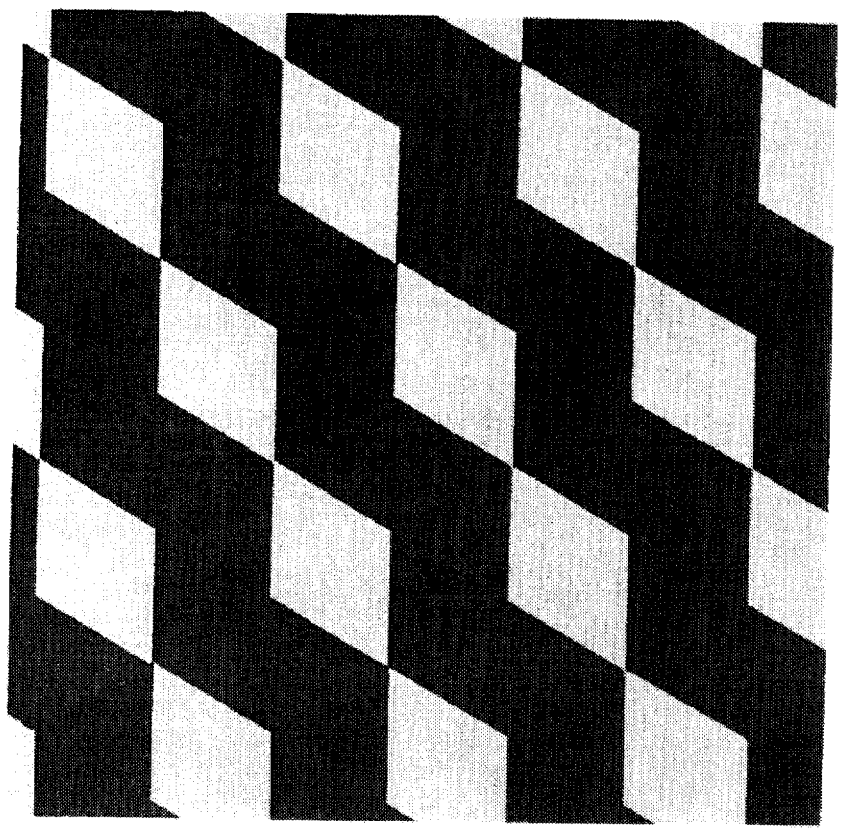
FIG. 14B is a color photograph of a second surface of the solid surface material of FIG. 14A.
Figure 17A:
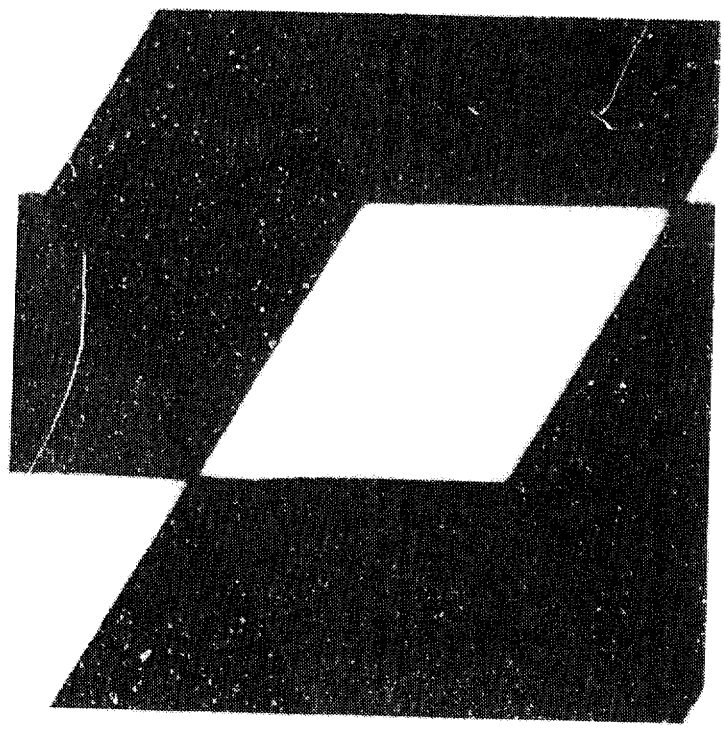
FIG. 17A is a black and white photograph of a first surface of a solid surface material having a first tessellated pattern.
Figure 17B:
FIG. 17B is a black and white photograph of an edge surface of the solid surface material of FIG. 17A having a pattern that is distinct from the first surface shown in FIG. 17A.
Figure 17C:
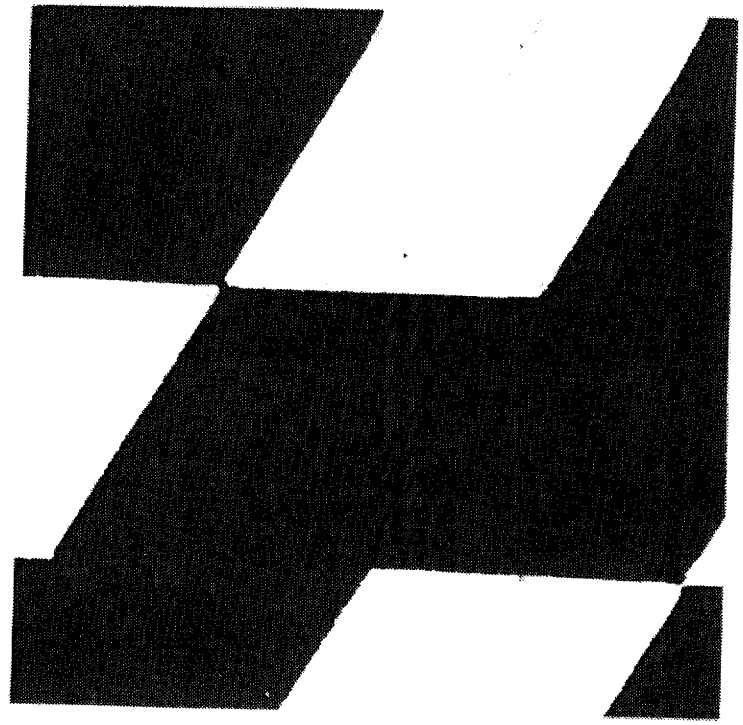
FIG. 17C is a black and white photograph of a second surface of the solid surface material shown in FIG. 17A having a second tessellated pattern.

The present invention can also form a molded article that is a monolithic structure with at least two distinct decorative patterns throughout a thickness of the structure. As best seen in FIGS. 14A–14B and 17A–17C, the molded article can have a first pattern on a first surface (as best seen in FIGS. 14A and 17A) and a second distinct pattern on a second surface opposite the first surface (as best seen in FIGS. 14B and 17C, respectively). In addition, as best seen in FIG. 17B, the molded article often has at least one third surface (in this case, the edge surface) that has a third pattern that is distinct from the first and second patterns. Another novel feature of the invention is that these patterns are retained even after the structure undergoes machining, grinding, polishing, cutting and combinations of such actions. This is because the patterns of the present invention are formed throughout a thickness of the molded article, rather than as an imprint on a surface of the molded article. Furthermore, because the molded article is derived from a thermoplastic composition, the molded article can be further processed as a component of a more complex molded article. For example, two molded articles, even when fully densified, may be combined in whole or in part to form a third molded article by compression molding.

Decorative Patterns

The thermoplastic intermediates of the invention can also be used to form other patterns using molds.

For example, the aqueous thixotropic slips or composite pastes can be applied to a mold containing a pattern, allowed to dry and then compression molded. Also, aqueous thixotropic slips or composite pastes of contrasting appearance can be applied to different portions of the pattern mold. In addition, a template having vertical walls separating and defining a pattern can be used. Furthermore, aqueous thixotropic slips and/or composite pastes or composite powder can be applied to different portions of the template and the template then removed. Because of the thixotropic nature of the slip and high viscosity of the composite pastes, generally there will be no observable intermixing between different parts of the pattern. After drying and removal of the template, this can be compression molded.

The aqueous thixotropic slip can also be scored prior to drying. Scoring results in the formation of composite flakes having dimensions that are dictated by the scoring, unless the scored flakes are larger than the natural cracking pattern flakes. It is possible to coat multiple layers of aqueous thixotropic slips which are the same or different. Because of the thixotropic nature of the slips, there is very little intermixing between layers. This can lead to very interesting patterns when different colored slips are used.

Preformed composite pieces can also be used to form patterns: Different shapes can be cut from a porous piece and subsequently molded. For example, diamond shapes can be cut from two or more porous sheets having contrasting colors. These can then be arranged together and molded to form a diamond pattern with different colors. Such a part is a single monolithic part with consistent physical properties across color boundaries. Moreover, as previously discussed, two or more molded articles can be combined in whole or in part to form another molded article.

The latex-derived thermoplastic intermediates of the invention are useful in making solid surface material having decorative patterns that previously were not obtained using conventional materials. These decorative patterns include veined patterns, tessellated patterns, geometric inclusions, and patterns of stratified domains. The solid surface material of the invention may include one or any combination of these patterns.

As used herein, the pattern terms have the following definition:

"Veined Patterns"

By "vein," it is meant domains with sharply defined borders, having a width that is much smaller than the length. Typically, the aspect ratio is no less than 10 to 1 (length to width), preferably no less than 50 to 1. Generally, the width is between about 0.2 and 2 cm. The domains may be straight or crooked. The length of the veins may extend over the full length or width of the sample.

Veined patterns include "disordered/natural vein patterns" and "superimposed/predetermined vein patterns."

"Disordered/Natural Vein Patterns"

Patterns having one or more veins separating polyhedral domains of mutually complimentary shapes. These patterns include but are not limited to mud-cracked patterns and natural vein patterns, such as those formed by the natural drying phenomena or those formed by fracture under mechanical stress.

"Superimposed/Predetermined Vein Patterns"

Veined patterns in which the direction and distance between the veins are at least in part reproducible from a predetermined design.

"Tessellated Patterns"

Patterns covering a surface without gaps or overlaps by congruent plane figures (or domains) of one type or a few types, wherein the largest dimension of the domain is smaller than the smallest dimension of the surface. Tessellated patterns include tessellated patterns having irregularly shaped domains and geometric tessellated patterns (having regularly shaped domains). Familiar examples of irregularly-shaped tessellated patterns include mosaics and jig-saw puzzles. A familiar example of geometric tessellated patterns is a checker-board.

Tessellated patterns are distinguished from embedded patterns or terrazzo patterns (embedded patterns having irregularly shapes). Tessellated patterns provide a surface that is covered by distinguishable domains (of geometric or irregular shapes) that fit together such that the largest dimension of each domain is smaller than the dimensions of the covered surface. In contrast, an embedded pattern includes regularly shaped or irregularly shaped domains that are embedded within a continuous matrix that extends over the largest dimension of the covered surface.

"Geometric Inclusions"

An ordered arrangement of at least one predetermined shape embedded in a continuous background. One advantage of a solid surface including the geometric inclusions of the invention is that the process and material used to create such patterns do not limit the size of inclusion. Therefore, for example, the largest dimension of the inclusion may be greater than the thickness of the molded article.

"Patterns of Stratified Domains"

Patterns having one or more domains containing two or more veins that exhibit essentially parallel orientation.

Each of the solid surface patterns of the invention can be derived from the downstream composite intermediates of the high-Tg polymeric latex co-dispersion of the invention. Veins can be formed by creating and filling a crack cavity with any of the dry or wet intermediates, as well as with the co-dispersion. Veins can also be formed by creating and filling cracks in or gaps between preformed composite pieces. Tessellated patterns can be derived by (a) distributing flakes of different color and various sizes in various ratios to form mosaics; (b) placing composite powders, aqueous thixotropic slips, and or composite pastes in segregated domains to form geometric tessellated patterns; and/or (c) placing porous pieces in a geometric pattern to form geometric tessellated patterns. Geometric inclusions can be derived from (a) compression molding and/or ram extruding composite powders in predetermined shapes; (b) arranging porous pieces of a desired shape(s) in a mold; and/or (c) placing molded, dried and sintered composite pastes and/or aqueous thixotropic slips of a desired shape(s). A superimposed/predetermined vein pattern can be derived from (a) impressing a pattern into an aqueous thixotropic slip prior to drying, and/or (b) placing an impression on one or more porous pieces, scouring and cracking the piece, and optionally back filling with composite powders and/or porous flakes, followed by compression molding. Patterns of stratified domains can be derived by alternate layering of different colored composite powders and/or aqueous thixotropic slips.

The versatility of the patterns in the solid surface material of the invention include the ability to provide completely different patterns on various surfaces of the material.

Advantages and methods of making various aspects of the invention are illustrated in the following examples.

Examples

Aspects of the present invention are shown by the following examples for purposes of illustration. These examples and embodiments are not meant to limit the invention in any way. Those skilled in the art will recognize that charities, additions, and modifications may be made, all within the spirit and scope of the invention. All percentages are by weight, unless otherwise indicated.

Abbreviations

| | |
|---|---|
| AA | ammonium acetate |
| AH | ammonium hydroxide |
| ATH | alumina trihydrate |
| BA | butyl acrylate |
| EDMA | ethylene glycol dimethacrylate |
| GMA | glycidyl methacrylate |
| MAA | methacrylic acid |
| MMA | methyl methacrylate |
| PMMA | poly(methyl methacrylate) |

Physical Measurements

Average colloidal particle size was determined by quasielastic light scattering (aka: dynamic light scattering, photon correlation spectroscopy). Glass transition temperatures ($T_g$) were determined by differential scanning calorimetry, heating at 10° C./min. Number- and weight-average molecular weights (Mn and $M_w$, respectively) were determined by gel permeation chromatography.

Latex Dispersions

Acrylic latex dispersions in deionized water were prepared by batchwise emulsion polymerization, using standard procedures similar to those described in S. R. Sandler & W. Karo, "Polymer Synthesis," Vol. 1, p. 293 (Academic Press, 1974). Monomer content ranged from 33 to 45%. Polymerization was initiated by ammonium persulfate (0.16 to 0.472 g/l) and the surfactant was ammonium lauryl sulfate (0.675 to 1.651 g/l).

Pigments

The PCN and oxide pigments were from Penn Color (Doylestown, Pa.). The "Afflair" pigments were from EM Industries (Hawthorne, N.Y.). The $TiO_2$ was from E. I. du Pont de Nemours and Company, Inc. (Wilmington, Del.). Other pigments commonly used in paints were also used.

Example 1
Acrylic Latex Dispersions

This example illustrates the formation of different acrylic latex dispersions.

Following the general procedure outlined above, latex dispersions of different acrylic polymers were prepared with the properties listed in Table 1 below.

TABLE 1

Latex Dispersions

| Ex. | Monomer (wt. %) | Solids (wt %) | Particle Size (nm) | Viscosity (cP) | $T_g$ ° C. | Mn (kD) | Mw (kD) |
|---|---|---|---|---|---|---|---|
| 1A | MMA | 32.3 | 109 | 102 | 129 | 324 | 864 |
| 1B | MMA | 41.7 | — | 124 | 129 | — | — |
| 1C | MMA | 44.8 | 135 | 310 | 129 | — | — |
| 1D | MMA/MAA (98/2) | 33.3 | 76 | — | 127 | 341 | 1020 |
| 1E | MMA/BA/GMA/MAA (73/15/10/2) | 33.5 | 80 | — | 87 | — | — |
| 1F | MMA/BA/GMA/MAA (58/30/10/2) | 33.5 | 79 | — | 56 | — | — |
| 1G | MMA/BA (95/5) | 44.8 | — | 310 | 115 | 156 | 450 |
| 1H | MMA/EDMA (99.5/05) | 33 | | | | | |

Example 2
Latex Co-Dispersion

This example illustrates the formation of co-dispersions using different mineral fillers and different pigments as decorative fillers.

The required amount of latex dispersion was charged into a mixing vessel equipped with a propeller-type of mechanical stirrer mounted near the bottom of the vessel. The required mount of dry mineral filler and, optionally pigment (s), were added with continued stirring.

The mineral fillers used included ATH; silicate glass powder, Pemco H-8221, from (Pemco Corp., Baltimore, Md.); and aluminosilicate Zeospheres®, from 3M (St. Paul, Minn.). The pigments were added either as dry solids ("dry") or as pre-dispersed concentrates in water with 10% solids ("conc"). The pigment dispersions were prepared directly from the dry pigment powder by means of a high-shear laboratory mixer (Ross Laboratory mixer emulsifier from Charles Ross & Son Co., Hauppage, N.Y.). In some instances, small amounts of a non-ionic or anionic surfactant were included. These co-dispersions are summarized in Table 2 below. Unless otherwise stated, the mineral filler was ATH.

TABLE 2

Co-Dispersions

| Sample | Pigment type (grams)† | Color | Weight % Pigment | Latex | Mineral |
|---|---|---|---|---|---|
| 2-A | none | | | 37 | 63 |
| 2-B | none | | | 37 | 63* |
| 2-C | none | | | 37 | 63** |
| 2-D | blue pigment (1.1) dry Afflair 183 (3.3) dry | blue white | 2 | 36 | 62 |
| 2-E | black pigment (1.1) dry Afflair 183 (3.3) dry | black white | 2 | 36 | 62 |
| 2-F | black pigment (0.6) dry Afflair 163 (6.0) dry | black pearl | 3 | 35 | 62 |
| 2-G | blue pigment (1.1) dry Afflair 183 (3.3) dry | blue white | 2 | 36 | 62 |
| 2-H | green pigment (1.1) dry red pigment (1.1) dry Afflair 183 (2.2) dry | green red white | 2 | 36 | 62 |
| 2-I | red pigment (1.1) dry green pigment (1.1) dry Afflair 183 (2.2) dry | red green white | 2 | 36 | 62 |
| 2-J | Afflair 183 (2.2) dry | white | 1 | 37 | 62 |
| 2-K | Velveteen black (1.1) conc | black | 0.5 | 37.5 | 62 |

TABLE 2-continued

Co-Dispersions

| Sample | Pigment type (grams)† | Color | Weight % Pigment | Latex | Mineral |
|---|---|---|---|---|---|
| 2-L | red pigment (1.1) dry Afflair 183 (3.3) dry | red white | 2 | 36 | 62 |
| 2-M | Red iron oxide (4.7) conc PCN green (2.65) conc PCN blue (2.65) conc Yellow iron oxide (5.0) conc | red green blue yellow | 0.675 | 37.325 | 62 |
| 2-N | Red iron oxide (0.5) conc PCN blue (0.5) conc Yellow iron oxide (4.81) conc Velveteen black (5.0) conc | red blue yellow black | 0.45 | 37.55 | 62 |
| 2-O | Red iron oxide (0.67) conc PCN blue (0.33) conc Yellow iron oxide (1.5) conc $TiO_2$ (7.5) conc | red blue yellow white | 0.45 | 37.55 | 62 |
| 2-P | Red iron oxide (0.17) conc PCN blue (0.08) conc Yellow iron oxide (0.38) conc $TiO_2$ (9.37) conc | red blue yellow white | 0.45 | 37.55 | 62 |

TABLE 2-continued

Co-Dispersions

| | | | | Weight % | |
|---|---|---|---|---|---|
| 2-Q | Afflair 183 (1.98) dry<br>Mearlin 249X (0.22) dry | white<br>bronze | 1 | 37 | 62 |
| 2-R | TiO$_2$ (1.0) dry<br>Mearlin 2339X (0.6) dry<br>Mearlin 249X (0.6) dry | white<br>gold<br>bronze | 1 | 37 | 62 |
| 2-S | Ciba 096CO33 (2.2) dry | yellow | 1 | 37 | 62 |

† Afflair pigments from EM Industries; Velveteen Black available from Kohnstamn (Ontario, Canada) PCN and oxide pigments available from Penncolor Mearlin pigments available from Mearl Corporation (New York, NY) Ciba pigment available from Ciba Specialty Chemicals Corp. (Newport, DE)
\* silicate glass used as mineral filler
\*\* Zeospheres ® used as mineral filler

Example 3
Spray-Dried Composite Powders

This example illustrates the preparation of composite powders from the co-dispersions of the invention by spray-drying.

The co-dispersion from Example 2, containing 21.4% PMMA and 33.8% ATH, was stirred continuously and pumped into a Bowen vertical spray drying unit, 4 feet (1.2 m) in diameter. The inlet temperature was maintained at 265° C. and the outlet temperature at 136° C. The dried product was a white, free-flowing powder. It was collected from the drying chamber, gravity trap, and cyclone corresponding to a total yield of 90%. The particle size distribution, determined using a Microtrac Full Range Analyzer, was in the range of 18 to 592 microns, with a median of 120 microns. A scanning electron micrograph of the spray-dried powder particles, FIG. 1, showed them to be roughly spherical objects where the surface was completely coated by polymer.

Examples 4–5

Examples 4 and 5 illustrate the formation of composite pastes and aqueous thixotropic slips, and the dependency of viscosity on shear rate for these materials.

Figure 8:
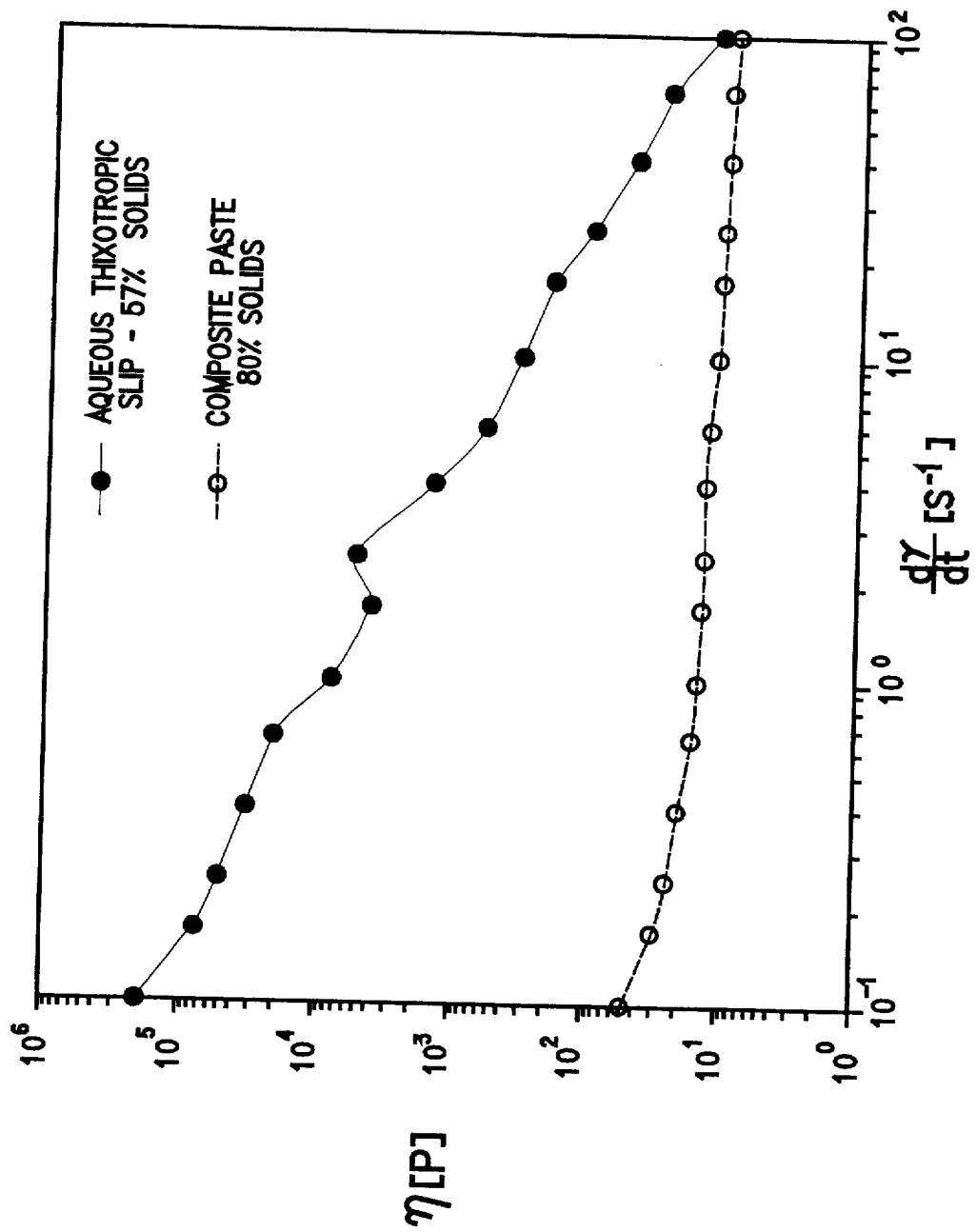
FIG. 8 is a graph of viscosity versus shear stress for a composite paste and an aqueous thixotropic slip.

FIG. 8 illustrates the difference between the shear thinning behavior of the thixotropic slip as compared to the near Newtonian rheology of the composite paste. FIG. 8 shows the variation of the viscosity (η, in units of poise [P]), with shear rate $$\frac{d\gamma}{dt},$$

in units of reciprocal seconds [s$^{-1}$]).

Example 4
Composite Paste

Composite powder was prepared by spray drying as described in Example 3, using a co-dispersion made from 100 parts latex 1D and 56.8 parts ATH. The dried powder contained 63% ATH. 20.3 g of this composite powder was added to a co-dispersion of 6.25 g ATH in 11 ml of latex 1F. The resulting composite thick paste had a solids content of 80.2%. As illustrated in FIG. 8, the composite paste exhibited a nearly Newtonian rheology with a viscosity of 1.4 poise. No visible sedimentation was observed over a period of several weeks.

Example 5
Aqueous Thixotropic Slip

A co-dispersion was prepared from 330 ml of latex 1F and 187.5 g ATH. To this was added with continuous stirring 2.5 ml of 4M ammonium hydroxide and 4.8 ml of 50% aqueous ammonium acetate. The viscosity increased rapidly and within a few minutes of stirring, the mixture became aqueous thixotropic. Development of a finite yield stress was evident from the ability of the mixture to support a laboratory spatula in a vertical position, and to hold its shape when extruded from the end of a cylinder 1 cm in diameter. The total solids content of this aqueous thixotropic slip was 57%. As shown in FIG. 8, the viscosity of the aqueous thixotropic slip is more than 1000 times higher at low shear, and falls by a factor of about 10$^4$ as the shear rate was increased by a factor of 10$^3$. Following application of high shear, approximately one minute of rest was required to restore the original yield stress and viscosity.

The yield stress for the aqueous thixotropic slip could be determined by extrapolating the shear stress to a shear rate of zero. The yield stress for this slip was approximately 1100 Pa.

When a mineral particle such as ATH, with a density ($\rho_2$) of 2.42 g/cm$^3$, in suspended is a viscous fluid with density $\rho_1$, it will sediment under the force of gravity at a velocity (v) in accordance to Equation (2) below:

$$v = \frac{2}{9} \frac{R^2(\rho_2 - \rho_1)g}{\eta_{app}} \qquad \text{Equation (2)}$$

where R is the particle radius, g is the acceleration of gravity, and $\eta_{app}$ is the apparent viscosity. For a typical ATH particle with R=40 microns and $\eta_{app}$=10$^5$ poise, the predicted settling velocity would be 2.8 mm/hour. In practice, no detectable sedimentation of ATH particles was observed even after the slip had been stored for more than a month. This can be understood as a consequence of the fact that the yield stress is much greater than the gravitational stress $\sigma_s$ exerted by each particle on the surrounding fluid. This stress is approximately equal to the sedimentation force divided by the cross-sectional area in accordance to Equation (3) below:

$$\sigma_s = 4/3\pi R^3(\rho_2 - \rho_1)g/\pi R^2 = 4/3R(\rho_2 - \rho_1)g \qquad \text{Equation (3)}$$

Thus $\sigma_s$ is about 95 Pa versus a $\sigma_y$ of 1100 Pa. Since the yield stress is much greater than the stress (shear stress), the velocity (b) goes to zero, and the slips are expected to remain indefinitely stable with respect to sedimentation.

Example 6
Drying of Aqueous Thixotropic Slips

This example illustrates the preparation of composite polymeric flakes from aqueous thixotropic slips, and the effect on the thickening agent concentration or crack pattern.

A series of aqueous thixotropic slips were prepared by the addition with stirring of different quantities of 10M ammonium acetate to 500 g batches of co-dispersions. The co-dispersions were prepared from latex 1A and ATH with 21.4% PMMA and 33.8% ATH. The resulting slips were all thixotropic, but exhibited a yields stress or stiffness that increased with the amount of AA added. Each batch was shaped into a square shaped open mold 6×6 inches (15.2× 15.2 cm) and 1 inch (2.5 cm) in height, and then dried under convected hot air at about 120° C. After 10 minutes, the pattern of cracks on the upper surface was fully developed and did not change substantially on proceeding to complete dryness. The crack pattern was quantified by counting the average number of cracks which intersect four six-inch (15.2 cm) lines and dividing by 24, identified as "cracks/inch," as summarized below.

TABLE 3

| Sample | AA (ml) | slip density (g/ml) | cracks/inch (2.54 cm) |
|---|---|---|---|
| 6A | 4 | 1.30 | 0.33 |
| 6B | 6 | 1.28 | 0.50 |
| 6C | 8 | 1.25 | 0.96 |
| 6D | 10 | 1.21 | 0.83 |

These results show that up to a certain limit, the crack pattern may be regulated by the extent of flocculation of the slip. The density values are less than the theoretical value of 1.29 g/ml, due to the inclusion of air bubbles which cannot be dissipated once the slip has been flocculated.

Example 7
Drying of Aqueous Thixotropic Slips Containing Dispersed Air Bubbles

This example illustrates the influence of dispersed air bubbles on the crack pattern obtained when aqueous thixotropic slips are dried.

A series of aqueous thixotropic slips were prepared from 500 gram batches of a high-solids co-dispersion containing 25.5% PMMA latex 1A and 43.4% ATH. The density would have been 1.40 g/ml in the absence of air bubbles. Different amounts of AA were added, and stirring speed was varied in order to control the amount of dispersed air bubbles. The results are summarized in Table 4 below.

TABLE 4

| Sample | AA (ml) | Conditions | Slip Density (g/ml) | Cracks/in (2.54 cm) |
|---|---|---|---|---|
| 7A | 1.0 | slow | 1.3 | 0.167 |
| 7B | 1.25 | moderate | 1.07 | 0.375 |
| 7C | 1.25 | fast | 0.92 | 0.50 |

Examples 8–9

These examples illustrate the formation of polymeric particles derived from a thixotropic slip containing no mineral filler. While the polymeric particles Examples 8 and 9 are filled polymeric particles, it is understood that unfilled polymeric particles can be formed in a similar manner.

Example 8
Irregularly-shaped Polymeric Particles

The filler used in this example was a colored mica pigment, Afflair 9502. The mica particles had particle sizes ranging from about 1–500 microns. A thixotropic slip containing no mineral fillers was prepared from 200 g of latex 1D and 7.2 g of the mica pigment and adding 10M ammonium acetate (AA) until thixotropy and yield stress was achieved as indicated by the mixture being able to support a laboratory spatula in the vertical position (about 1–3 ml). The slip was spread onto a glass plate at an average thickness of 0.015 inch (0.038 cm) and dried in a convection oven at 140° C. The resulting product consisted of irregularly shaped flat polymeric particles in the with diameters ranging from 0.1 to 2 mm. The mica pigment was generally oriented such that the plane of the pigments was parallel to the plane of the flat polymeric particle. When incorporated as a minor component in compression molded materials, the polymeric particles resembled natural metallic inclusions such as iron pyrite, marcasite, native copper or gold.

Example 9
Geometric-shaped Polymeric Particles

The filler used in this example was a colored mica pigment, Afflair 363, having particle sizes in the range of about 1–500 microns. A thixotropic slip containing no mineral fillers was prepared from 600 ml of latex 1H, 35 g of the mica pigment and 2 ml of 50% AA. This slip was coated on a glass plate at a thickness of 2 mm and was scored with a razor to create a grid of diamond shapes approximately 5 mm wide. When dried in a convection oven at 140° C., spontaneous cracking was restricted to the score lines, so that diamond flat polymeric particles of approximately the same size were formed.

While Examples 8 and 9 illustrate formation of the polymeric particles directly from a thixotropic slip containing no mineral fillers, it is understood that the polymeric particles can also be made from downstream intermediates of a thixotropic slip containing no mineral fillers or from a latex co-dispersion containing no mineral fillers. For example, the same processing steps for making any of the dry composite intermediates (b), (c), and (e) can be followed to form polymeric particles useful in the invention, by substituting the aqueous thixotropic slip (containing mineral filler) and/or thermoplastic latex co-dispersion (containing mineral filler) used in those processing steps with the thixotropic slip containing no mineral fillers and/or latex co-dispersion containing no mineral fillers.

Example 10
Preformed Composite Pieces

This example illustrates the formation of pre-formed porous composite shaped pieces and the formation of a dense molded article including shaped inclusions.

The filler used in this example was a white mica pigment, Afflair 183, having a particle size range of 1–500 microns. An aqueous thixotropic slip was prepared from 250 ml of latex 1A, 6.7 g of the mica pigment and 1 ml of 50% AA. The slip was extruded through a disposable plastic pipette having an opening of about 2 mm in diameter, into individual shapes with a cloverleaf pattern approximately 1 cm in diameter and 5 mm thick. The majority of these shapes remained intact when dried at 140° C. When the cloverleaf flakes were combined with a composite powder of a different color and compression molded, the flakes retained their shape and were visible as cloverleaves when viewed from the surface of the molded product. The final molded product had a thickness of about 3 mm with included pieces approximately 1 cm in diameter.

Example 11
Use of Ground Commercial Solid Surface Material as Polymeric Particles This example illustrates the use of mineral-filled acrylic particles as a decorative filler.

Mineral-filled acrylic particles approximately 5 mm in diameter were obtained by grinding a solid surface material comprising crosslinked acrylic with 62% ATH by weight. An aqueous thixotropic slip was prepared from 100 ml of latex 1H, 5.8 g of colored mica pigment (Afflair 9504), 150 g of the ground acrylic particles, and 50% AA added until thixotropy and yield stress were achieved as indicated by the mixture being able to support a laboratory spatula in the vertical position. The slip was spread onto a glass plate and dried at 100° C. The ground acrylic particles were recovered embedded in a coating of mica-pigmented latex approximately 1 mm thick. When these particles were compression molded into a dense product, the original ground acrylic particles became densely packed with a uniformly highlighted mica-containing binder phase.

Example 12
Composite Flakes Coated with a Contrasting Color

A white aqueous thixotropic slip was prepared from 500 ml latex 1A, 50 ml water, 258 g ATH, 13 g Afflair 9163, and 1.2 ml 50% AA The composition had a solids content of 37% PMMA, 60% ATH and 3% mica. A black co-dispersion was prepared from 200 ml latex 1A and 7.2 g Velveteen Black pigment available from Kohnstamn (Ontario, Canada). The composition had a solids content of 90% PMMA and 10% black pigment.

Irregularly shaped white flakes approximately 8 mm in diameter and 2 mm thick were prepared from the white slip as described in Example 8. These were placed on a glass plate and coated with four alternating layers of black and white slips. This was then dried to form flakes.

Example 13
Stratified Composite Flakes

The black and white slips from Example 12 were coated onto a 6×6 inch (15.2×15.2 cm) glass plate in seven alternating layers, ranging in thickness from 1 mm to 5 mm. Each layer was partially dried before application of the next layer, but not to the point of cracking. After the last layer was coated, the entire structure was allowed to crack by drying at 120° C. to produce multi-layer bi-colored porous composite polymeric flakes approximately 1 cm thick and 1.5 cm in diameter.

A compression molded article incorporating these stratified composite flakes contained a pattern of stratified domains, as best seen in FIG. 6.

Examples 14–19

These examples illustrate compression molding of porous composite polymeric flakes, porous composite polymeric shaped pieces, and composite powders to form non-porous materials.

Example 14
Pattern Containing One Stratified Domain

Two high-solids aqueous thixotropic slips with 68 wt % solids, based upon the weight of the slips, were prepared from latex 1C with solids composed of 37 wt % PMMA and 63 wt % ATH, based upon the weight of the solids. To the second latex was added a small amount of PCN green pigment, to approximately 0.5 wt % solids. These were coated in 12 uniformly thick 5 mm alternating layers onto a strip of polyester film 1×5 inches (2.5×12.7 cm). While still wet and flexible, the sample was deposited edgewise into a compression molding die so that the banded pattern was visible from the open face of the die, and the plastic strip was carefully removed. The sample was dried at 120° C. As a consequence of the high solids content and low shrinkage, only one narrow crack formed. The sample was then compression molded in the die to form a dense product in which the crack was completely healed.

Example 15
Pattern Including Shaped Embedded Domains

Colored particles were made by grinding acrylic solid surface materials having different colors. A colored aqueous thixotropic slip was prepared from 110 ml latex 1F, 31.25 g ATH, 31.25 g ground colored particles, 1.1 ml of 4M AH and 2.4 ml of 50% AA. An unpigmented aqueous thixotropic slip was prepared from 110 ml latex 1F, 62.5 g ATH, 1.1 ml of 4M AH and 2.4 ml of 50% AA.

Using a plastic pipette having an opening about 2 mm in diameter, the colored slip was extruded onto a solid substrate of porous plaster of Paris bat, to form the word "SLIP." The writing was approximately 4 mm wide and 3 mm thick and, because of its thixotropic nature, retained its shape and did not run. The unpigmented slip was spread around it. This was dried at 120° C. and compression molded to form a monolithic tile 4.5×8.5×0.4 cm with the writing sharply defined on one surface.

A second sample of the colored slip was spread onto the surface of a plastic template lying on a solid substrate of glass. The template was carefully removed from the surface, leaving a rosette pattern 7 mm in diameter and 7 mm deep. The unpigmented slip was spread around this pattern and the part was dried and molded as above.

A third sample of the colored slip was poured into a mold in the shape of a star 7 cm in diameter and 1.5 cm deep. The mold was carefully removed and the unpigmented slip was spread around the star. The part was dried and molded as above. In this case, the star pattern was preserved throughout the entire 5 mm thickness of the final part.

Example 16
Thin Layer of Mud-Cracked Veins

An unpigmented aqueous thixotropic slip was prepared from 250 ml latex 1D, 141.75 g ATH, and adding 10M AA until yield stress was achieved. A black pigmented aqueous thixotropic slip was prepared from 220 ml of Latex 1D, 125 g ATH, and 3 g Velveteen Black pigment, and 3.5 ml of 50% AA. The black aqueous thixotropic slip was coated, dried and sieved to form black composite powders.

A 2×2 inch (5×5 cm) compression molding die was coated with the unpigmented slip. This was dried at 120° C. to form a mud-crack pattern. The cracks were filled with the black powder from above and mica-filled gold flat polymeric particles from Example 8 above. A layer of composite powder from Example 3, 8 mm thick, was spread over the top. This was then compression molded. The bottom surface of the resulting monolithic product exhibited the mud-crack pattern with white polyhedral domains approximately 1 cm in diameter, separated by approximately 1 mm cracks filled with black composite powder and gold polymeric particles described in Example 8 above.

Example 17
Mud-crack Vein Pattern

An aqueous thixotropic slip was prepared from 250 ml of latex 1A, 129.3 g ATH, 11.15 g Afflair 183 available from EM Industries, having particle sizes ranging from about 1 to 500 microns, and adding AA until thixotropy and yield stress were achieved as indicated by the mixture being able to support a laboratory spatula in the vertical position.

The compression molding die from Example 16 above was filled with the above slip to a thickness of 1.25 cm. This was dried at 120° C. to form mud-cracks throughout the thickness of the sample, separated by about 1 cm on average. The cracks were filled with a composite powder mixture of 5 g of the composite powder from Example 3, 0.2 of the black composite powder from Example 16, and some mica-filled composite polymeric flake from Example 8. The sample was compression molded to obtain a tile 2×2×0.13 inches (5×5×0.3 cm) with the mud-crack pattern visible from both surfaces.

Example 18
Various Aqueous Thixotropic Slips

This example illustrates the formation of aqueous thixotropic slips with various compositions.

Latex 1-D was used with slightly varying % solids. Unless otherwise stated, the slips were formulated to contain latex polymer at 37% solids with the remaining solids comprising ATH and pigment(s). The required amount of latex dispersion was charged into a mixing vessel equipped with a propellar-type of mechanical stirrer mounted near the bottom of the vessel. The required amount of dry ATH and pigment(s) in the form of a concentrated aqueous dispersion were added, with the stirring rate increase as necessary to prevent sedimentation. AA concentrate was added until thixotropy and yield stress were achieved and sedimentation was suppressed. This was indicated, for example, when an aliquot of about 25 ml was allowed to stand for about 1 minute without stirring in a 50-ml beaker and the beaker could be inverted without any noticeable flow or displacement of the slip. The slips are summarized in Table 5 below.

of mold release agent, Zonyl® UR (E. I. du Pont de Nemours and Company, Wilmington, Del.) was applied to the working surfaces of the mold.

The mold frame and lower plate were assembled outside of the press and charged either with fully dry ingredients (porous polymeric flake, shaped polymeric pieces, or polymeric powder of the invention) or with thixotropic slip. When slip was used it was dried in a convection oven at

TABLE 5

Aqueous Thixotropic Slips

| Sample | Pigment (microns)† | Latex % solids | Amount Added (g) | | | 5M AA (ml) | Weight % of Solids | | | Slip % Solids |
|---|---|---|---|---|---|---|---|---|---|---|
| | | | Pigment | Latex | ATH | | Pigment | Latex | ATH | |
| 18-A | gold pigment | 44.9 | 3.84 | 641.4 | 476.14 | 27 | 0.5 | 37.5 | 62 | 68.5 |
| 18-B | Afflair 183 (1–500) | 32.3 | 10.24 | 1171.96 | 634.86 | 26.04 | 1 | 37 | 62 | 56.3 |
| 18-C | Afflair 183 (1–500) | 32.3 | 67.71 | 2585.3 | 1354.14 | 57.41 | 3 | 37 | 60 | 56.3 |
| 18-D | bronze (10–60) | 32.3 | 45.14 | 2515.43 | 1399.28 | 57.4 | 2 | 36 | 62 | 56.2 |
| 18-E | none | 32.3 | — | 100.38 | 52.9 | 2.18 | — | 38 | 62 | — |
| 18-F | Velveteen Black | 32.2 | 3.76 | 2585.31 | 1410.56 | 57.4 | 0.5 | 37 | 62.5 | 55.5 |
| 18-G | Glo-Lux | 32.3 | 45.1 | 2240.6 | 1212.7 | 70 | 2.3 | 36.5 | 61.2 | 50.8 |
| 18-H | Yellow Iron Oxide Red iRon Oxide Black pellets | 32.3 | 953.82 | 52783.35 | 28075.59 | 1172.01 | 2.07 | 37 | 60.93 | 55.5 |
| 18-I | bronze (10–60) | 32.3 | 45.14 | 2515.43 | 1399.28 | 57.4 | 2 | 37 | 62 | 56.2 |

† pigments in 18-A are from Mearl Company, New York, NY pigments in 18-B and C are from EM Industries (Hawthorne, NY) pigments in 18-D, H, and I are from Penncolor (Doylestown, PA) pigments in 18-F are from Kohnstamn (Ontario, Canada) pigments in 18-G are from Hirotec Inc., Santa Ana, CA Example 19
Compression Molding Conditions This example illustrates the formation of molded articles from the aqueous thixotropic slips, porous composite polymeric flakes, shaped composite polymeric pieces and composite powders.

Unless otherwise indicated, all slip, powder and flake were formulated to comprise 37% polymer and 63% combined ATH plus pigment(s), by weight base on dry solids. The molds were constructed of steel or aluminum. The steel mold consisted of a straight-sided frame (square or parallelogram) with an overall thickness at least twice that of the final molded part, with top and bottom plates machined to fit precisely into the frame. The aluminum molds consisted of a steel frame bolted onto an aluminum base plate with a matching aluminum "pusher" plate which fit loosely within the frame. Molding conditions were controlled by means of a hydraulic press with platens that were thermostatically controlled, electrically heated and water cooled (Wabash hydraulic press model 75-2424-2TMX from Wabash Metal Products Inc., Wabash Ind.). A light coating about 120° C. until the residual water content was less than about 0.5% prior to the addition of any powder to backfill cracks.

The molding was carried out in one of three ways: (1) the charged mold was preheated to the molding temperature in a separate oven prior to transferring to the heated press; (2) the mold was assembled and transferred to the preheated press; (3) the mold was transferred to the press at a temperature below the final temperature and gradually brought up to the final temperature. The products obtained by the three different molding techniques were equivalent. After molding, the temperature of the mold was generally reduced to between about 100 and 130° C. before releasing the pressure and removing the mold from the press. The mold was disassembled and the sample was removed at temperature at or below about 80° C. The molding materials and conditions are given in Table 6 below, where the time indicates either the total time at the temperature indicated, or the time required to reach that temperature in the press.

TABLE 6

Molding Conditions

| Sample | Latex | Mineral Filler (M) Pigment (P) Polymeric Filler PF) | Added as | P, psi (kg/cm²) | Temperature, ° C. | Time, minutes | Dimensions W × L × H, inches (cm) | Pattern |
|---|---|---|---|---|---|---|---|---|
| 19-A | 1-D | M = ATH | powder | 694(48.6) | 185 | 10 | 3 × 6 × 0.35 (7.6 × 15.2 × 0.89) | none |
| 19-B | 1-D | PF = 40% FAP-4** | powder | 694(48.6) | 185 | 10 | 3 × 6 × 0.35 (7.6 × 15.2 × 0.89) | none |

TABLE 6-continued

Molding Conditions

| Sample | Latex | Mineral Filler (M) Pigment (P) Polymeric Filler PF) | Added as | P, psi (kg/cm$^2$) | Temperature, ° C. | Time, minutes | Dimensions W × L × H, inches (cm) | Pattern |
|---|---|---|---|---|---|---|---|---|
| 19-C | 1-D | M = ATH | powder | 700(49) | 130–180 | 30 | 14 × 14 × 0.5 (35.6 × 35.6 × 1.3) | none |
| 19-D | 1-A | M = 63% Zeospheres | slip | 1000(70) | 180 | 10 | 7 × 7 × 0.5 (17.8 × 17.8 × 1.3) | mud-crack |
| 19-E | 1-A | P = 1% Afflair 183 | slip | 1000(70) | 190 | 5 | 12 × 12 × 0.5 (30.5 × 30.5 × 1.3) | mud-crack |
| 19-F | 1-A | M = ATH | powder | 780(54.6) | 180 | 10 | 3 × 6 × 0.35 (7.6 × 15.2 × 0.89) | none |
| 19-H | 1-D | P = 1% Afflair 9411 | slip | 1000(70) | 186 | 10 | 7 × 7 × 0.35 (17.8 × 17.8 × 0.89) | mud-crack |
| 19-I | 1-D | P = 1% Afflair 9411 | slip | 1000(70) | 184 | 5 | 7 × 7 × 0.35 (17.8 × 17.8 × 0.89) | mud-crack |
| 19-J | 1-D | P = 1% Afflair 9411 | slip | 1000(70) | 180 | 1 | 7 × 7 × 0.35 (17.8 × 17.8 × 0.89) | mud-crack |
| 19-K | 1-D | P = 1% Afflair 9411 | slip | 1000(70) | 187 | 10 | 7 × 7 × 0.47 (17.8 × 17.8 × 1.19) | mud-crack |
| 19-L | 1-A | M = ATH | powder | 1000(70) | 190 | 10 | 7 × 7 × 0.35 (17.8 × 17.8 × 0.89) | none |
| 19-M | 1-A | M = ATH | powder | 1000(70) | 180 | 5 | 7 × 7 × 0.35 (17.8 × 17.8 × 0.89) | none |
| 19-N | 1-A | M = ATH | powder | 1000(70) | 180 | 5 | 7 × 7 × 0.35 (17.8 × 17.8 × 0.89) | none |
| 19-O | 1-D | P = 1% Afflair 9163 0.5% Red Iron Oxide 0.5% Yellow Iron Oxide 2.6% powder from 2-J 5.1% powder from 2-K | slip | 1000 (70) | 177 | 10 | 7 × 7 × 0.50 (17.8 × 17.8 × 1.3) | mud-crack with black and white inclusions |

**FAP-4 is a mineral-filled acrylic fine powder from E. I. du Pont de Nemours and Company, Inc. (Wilmington, DE)

The mechanical properties of the articles fabricated above are given in Table 7 below. The properties are similar to those of acrylic solid surface products with equivalent ATH content, but made by conventional thermoset processes. The properties do not appear to depend upon whether the product was compression molded from dried composite slip, shaped composite particles, composite powders, or any combination of these.

Examples 20 and 21
Mosaic Patterns

These examples illustrate the fabrication of various colored porous composite polymeric flakes and their use in fabricating solid surface materials with multi-colored mosaic patterns.

Aqueous thixotropic slips were prepared as described in Example 18 using co-dispersions 2-D through 2-K.

TABLE 7

Physical Properties

| Sample | Hardness ASTM-D-785, Rockwell M | Flex Modulus ASTM-DC-790, 10$^6$ psi (10$^4$ kg/cm$^2$) | Strain-at-Break ASTM-D-638, % | Flexural Strength ASTM-D-790, 10$^3$ psi (kg/cm$^2$) | Work-to-Break ASTM-D-638, inch-lb (Joule) | Density, g/ml |
|---|---|---|---|---|---|---|
| 19-A | 87 | 1.54(10.8) | 0.72 | 9.67(67.7) | 2.18(0.246) | |
| 19-B | 81 | 1.45(10.2) | 0.76 | 9.45(66.5) | 2.09(0.236) | |
| 19-C | 89–91 | 1.47–1.57(10.3–11) | 0.69–0.74 | 9.3–9.9(65.1–69.3) | 1.95–2.21 (0.220–0.250) | 1.72–1.77 |
| 19-D | | 1.62(11.3) | 0.51 | 7.92(55.4) | 1.2(0.136) | |
| 19-E | 88.9 | 1.29(9.0) | 1.18 | 9.49(66.4) | 3.97(0.449) | |
| 19-F | 90.1 | 1.31(9.2) | 1.09 | 9.42(65.9) | 3.57(0.403) | |
| 19-H | | 1.44(10) | 0.78 | 9.9(69.3) | 2.38(0.269) | |
| 19-I | | 1.44(10) | 0.82 | 10.4(72.8) | 2.62(0.296) | |
| 19-J | | 1.45(10.1) | 0.84 | 10.68(74.2) | 2.77(0.313) | |
| 19-K | | 1.44(10) | 0.91 | 11.35(79.5) | 3.16(0.357) | |
| 19-L | 90–91 | 1.69(11.8) | 0.81 | 10.33(72.3) | 2.68(0.303) | |
| 19-M | 86–91 | 1.54(10.8) | 0.74 | 9.37(67.9) | 2.12(0.240) | |
| 19-N | 83–91 | 1.57(11) | 0.82 | 10.13(70.9) | 2.65(0.299) | |
| 19-O | 92 | 1.49(10.4) | 0.71 | 9.59(67.1) | 2(0.2) | 1.75 |
| Standards* | 94 | 1.4(9.8) | 0.81 | 7.8(54.6) | 2.48(0.280) | 1.68–1.8 |

*Standards taken from Corian ® Technical Bulletin CTDC-133, "Performance Properties of Corian ® Products," issued January, 1993 (E. I. du Pont de Nemours and Company, Wilmington, DE).

Each of the slips was dried into irregularly shaped composite flakes by means of a double drum dryer (Buflovak 6×8 inch (15.2×20.3 cm) Laboratory Double Drum Dryer; Buffalo Technologies Corp., Buffalo, N.Y.). With the drum gap set between 1/16 and 1/32 inch (0.16 and 0.08 cm), flakes were produced approximately 1 mm thick and with diameters ranging from 1 mm to 15 mm.

Example 20

A mixture of 50 grams each of the above composite flake made from co-dispersions 2-D, E, F, G and I were tumbled together to form mixed composite flake comprising 20% of each kind. 85 grams of the flake mixture was placed in a 4×4 inch (10.2×10.2 cm) square planar mold. The mold was put into a press set at 180° C. and was left at contact pressure for 15 minutes while the mixture reached press temperature. The pressure was then increased to 1250 psi (87.5 kg/cm$^2$) for 10 minutes. The press was then cooled to about 50° C. and the pressure reduced to atmospheric pressure, the mold was removed from the press and the sample removed from the mold. The surface was finished by sanding with a series of sandpapers: 100 grit, then 220 grit, then 400 grit, then 800 grit, then 1500 grit. The sample was then polished with Finesse-It Compounding Liquid and Finesse-It Finishing Liquid, both from 3M (St. Paul, Minn.).

Example 21

A mixture was made from composite polymeric flakes made from the following co-dispersions:

| | |
|---|---|
| Flake from 2-E | 12.5 g (5%) |
| Flake from 2-F | 12.5 g (5%) |
| Flake from 2-H | 12.5 g (5%) |
| Flake from 2-J | 200.0 g (80%) |
| Flake from 2-K | 12.5 g (5%) |

The mixture was tumbled together for form mixed composite flake. 250 grams of the flake mixture was placed in a 5×5 inch (12.7×12.7 cm) square planar mold. The mold was put into a press set at 180° C. and was left under contact pressure for 15 minutes while the material reached press temperature. The pressure was then increased to 1000 psi (70 kg/cm$^2$) for 10 minutes. The press was then cooled to about 50° C. and the pressure reduced to atmospheric pressure, the mold was removed from the press and the sample removed from the mold. The surface was finished by sanding with a series of sandpapers: 100 grit, then 220 grit, then 400 grit, then 800 grit, then 1500 grit. The sample was then polished with Finesse-It Compounding Liquid and Finesse-It Finishing Liquid, both from 3M (St. Paul, Minn.).

Example 22
Geometric Patterns from Composite Powders

This example illustrates the fabrication of geometric patterns derived from several different colored composite powders.

Aqueous thixotropic slips were prepared as described in Example 18 from co-dispersions 2-J and 2-L through 2-P.

Figure 9:
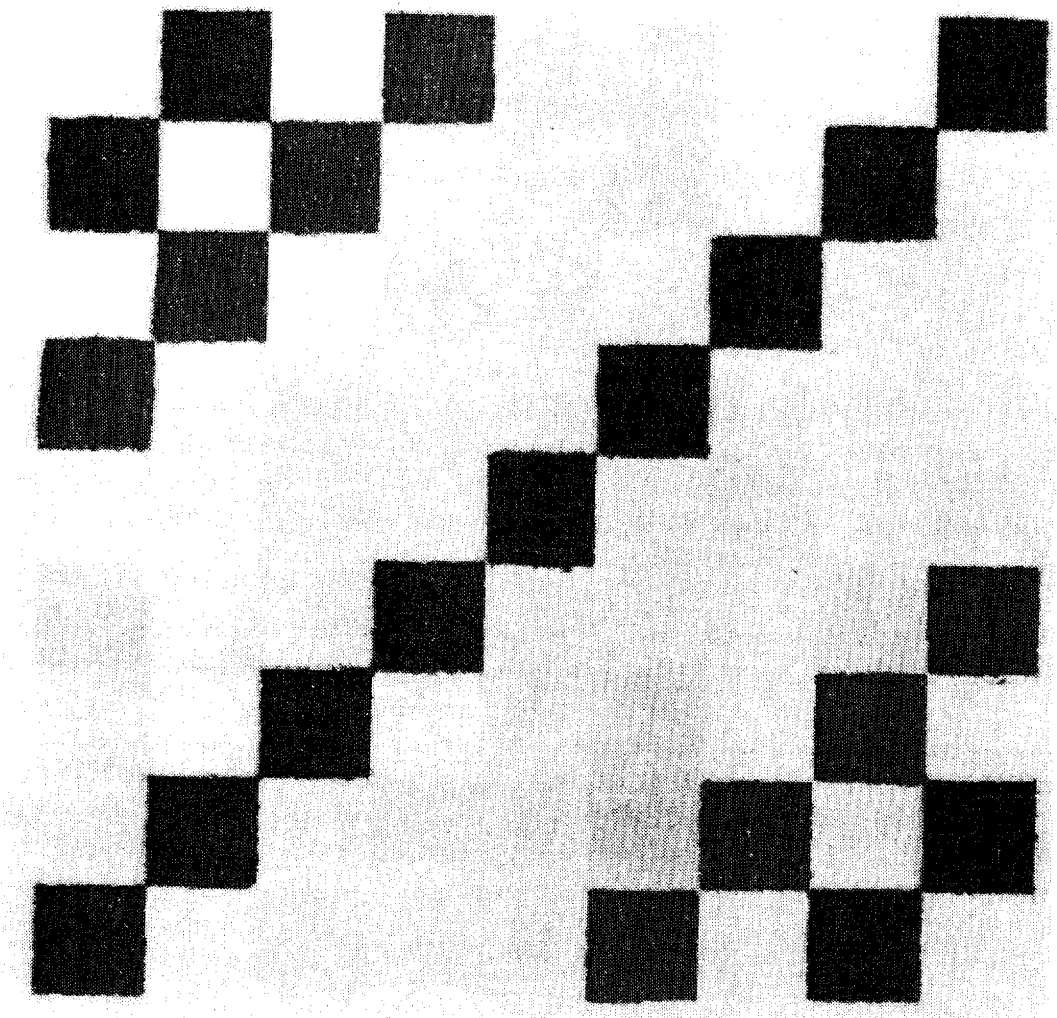
FIG. 9 is a color photograph of a surface of a solid surface material having a geometric inclusion pattern.

Composite polymeric flake was prepared from each slip as described in Example 20. Colored composite powders were prepared by crushing the corresponding flake. A 12-inch×12-inch×1.5-inch mold (30.5-cm×30.5-cm×3.8-cm) was divided into 144 equal 1×1 inch (2.54×2.54 cm) square segments by inserting a cardboard partition. Into each segment was deposited 3.8 g of composite powders made from 2-J, 2-L, and 2-M, keeping the different colored powders segregated so as to create a colored geometric pattern. The cardboard partition was carefully removed to avoid mixing the different colored powders, and the product was compression molded at 182° C. for 20 minutes at 1000 psi (70 kg/cm$^2$). The final product is shown in FIG. 9. The same pattern appeared on both sides.

Figure 10:
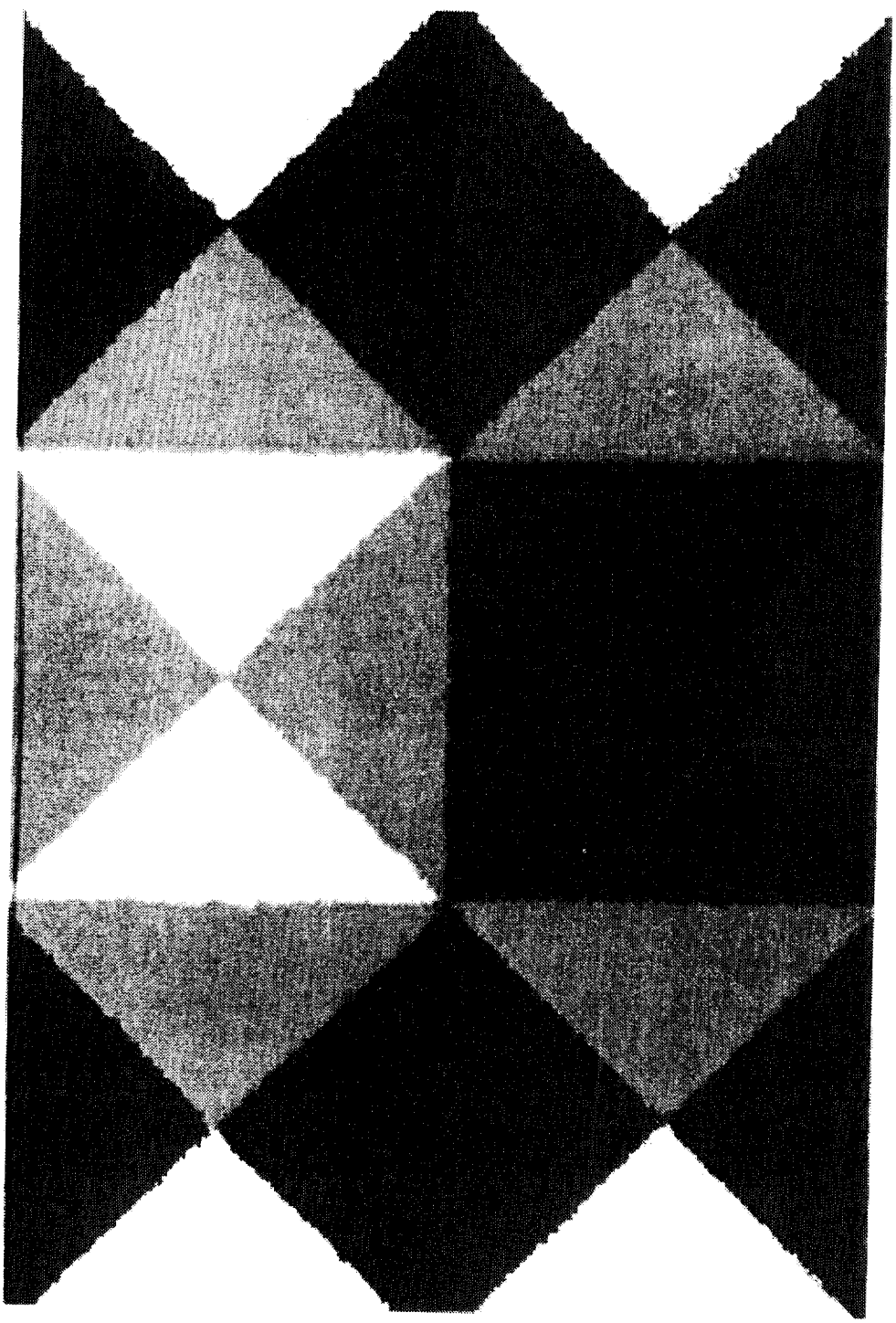
FIG. 10 is a black and white photograph of a surface of a solid surface material having a geometric tessellated pattern.

A similar product was prepared using composite powders made from co-dispersions 2-M, 2-N, 2-O and 2-P and a partition consisting of square domains subdivided into right-angled triangles. The 7-inch×7-inch×0.5-inch (17.8-cm× 17.8-cm×1.3-cm) part was molded at 185° C. for 10 minutes at 1000 psi (70 kg/cm$^2$). The final product is shown in FIG. 10.

Example 23
Combination Pattern of Geometric Inclusion and Mud-Cracked Vein

This example illustrates the fabrication of a complex pattern involving distinct mud-crack domains within a larger geometric pattern.

Figure 11:
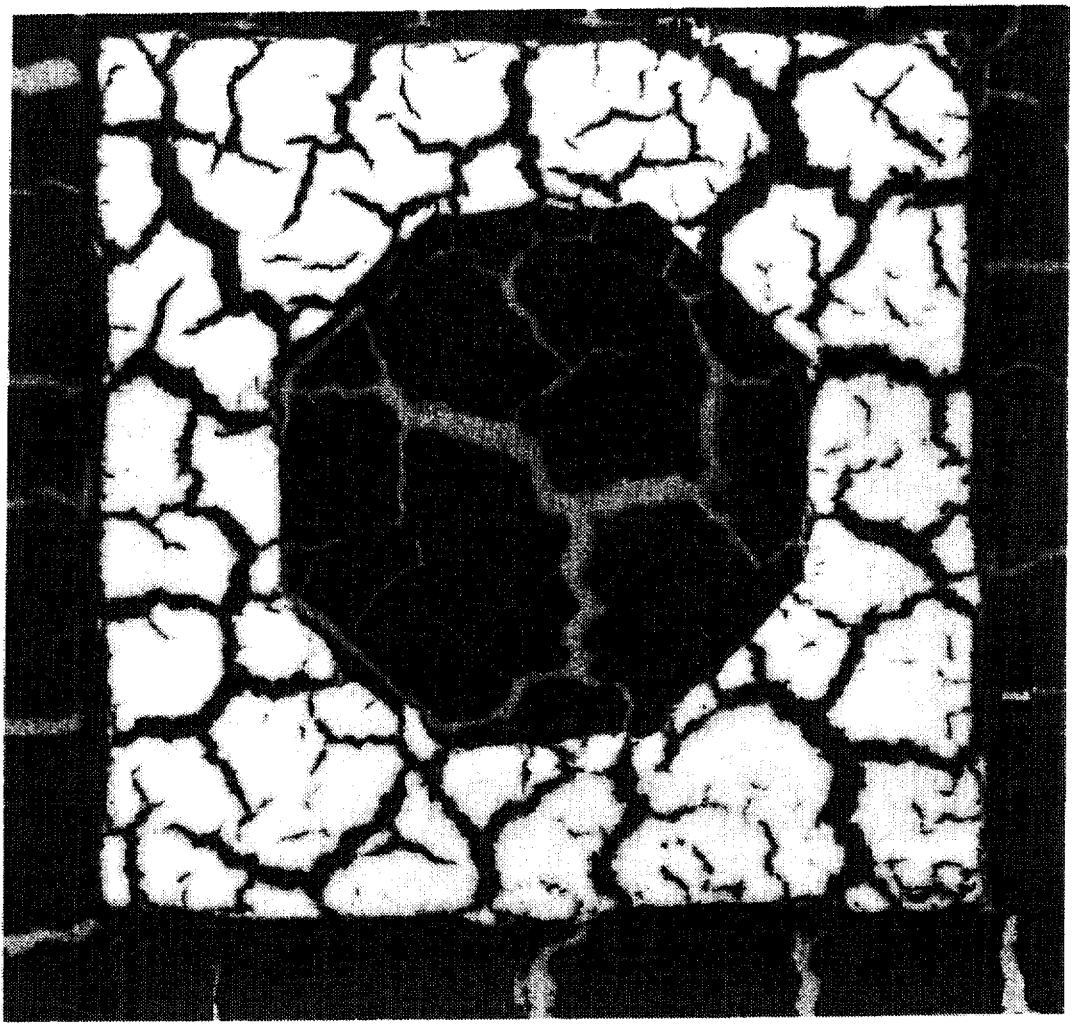
FIG. 11 is a black and white photograph of a surface of a solid surface material having a geometric inclusion pattern combined with a mud-cracked pattern.

Aluminum sheet metal was cut into two strips 1 inch (2.54 cm) wide and covered with plastic tape. One strip was bent to form an 8×8 inch (20.3×20.3 cm) square, and the second was bent to form an octagon 4.5 inch (11.3 cm) in diameter. The two forms were placed inside a 12-inch×12-inch×1.5-inch (30.5-cm×30.5-cm×3.8-cm) aluminum mold frame so as to partition the mold volume into concentric geometric domains. The octagonal central domain and the outer square domain were filled to a level of 1 inch (2.54 cm) with a black aqueous thixotropic slip made from co-dispersion 2-K which had been converted to a thixotropic slip as described in Example 18. The intervening domain was filled to a level of 1 inch (2.54 cm) with white slip made from co-dispersion 2-J. The slips were dried in a convection oven at 225° C. The mud-cracks in the white domain were filled with a black composite powder made from the above black slip. The cracks in the black domain were filled with a white powder made from co-dispersion 2-J. The aluminum partitions were then removed from the mold, taking care not to redistribute or mix any of the dried slip or back-fill powder. The part was compression molded at 184.7° C. and 1000 psi (70 kg/cm$^2$) for 10 minutes. The resulting monolithic product was 0.5 inch thick (1.3 cm) and weighed 2003.2 g. The product is shown in FIG. 11.

Example 24
Superimposed/Predetermined Vein Pattern

This example illustrates the fabrication of a complex pattern wherein a simple geometric motif of rectangular "bricks" is superimposed upon a mud-crack pattern.

Figure 12:
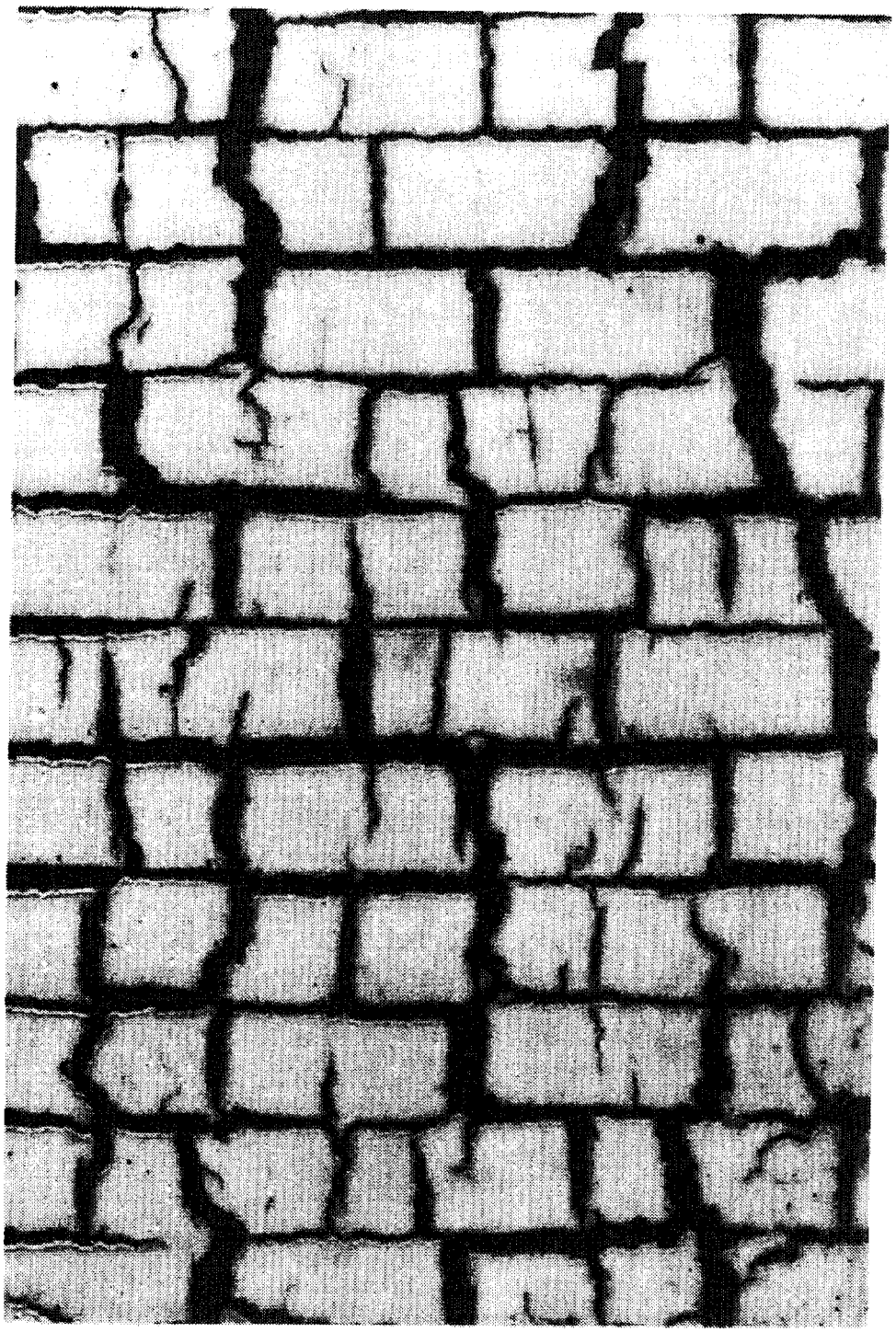
FIG. 12 is a black and white photograph of a surface of a solid surface material having a superimposed/predetermined vein pattern.

A 12-inch×12-inch×1.5-inch (30.5-cm×30.5-cm×3.8-cm) mold was filled with 3008 g of an aqueous thixotropic slip made from co-dispersion 2-J at 57% solids. The surface of the wet slip was leveled and then inscribed with a pattern of parallel lines separated by 1 inch (2.54 cm) which were crossed by irregularly spaced perpendicular lines, so as to resemble rows of brick masonry. This pattern was simply drawn approximately 0.25 inch (0.64 cm) deep into the slip by means of a steel ruler. As a consequence of its inherent yield stress, the slip showed no tendency to flow or refill the inscribed pattern which remained stable. The slip was dried in a convection oven at 225° C. for 3 hours. The stresses due to shrinkage during drying caused most of the inscribed lines to form cracks which penetrated through the entire thickness of the part and also formed additional irregular mud-cracks. the cracks were back-filled with 397 g black composite powder made from the black slip in Example 23. The part was compression molded at 183° C. and 1000 psi (70 kg/cm$^2$) for 10 minutes. The resulting product is shown in FIG. 12.

Example 25
Embedded Geometric Inclusions

Figure 13:
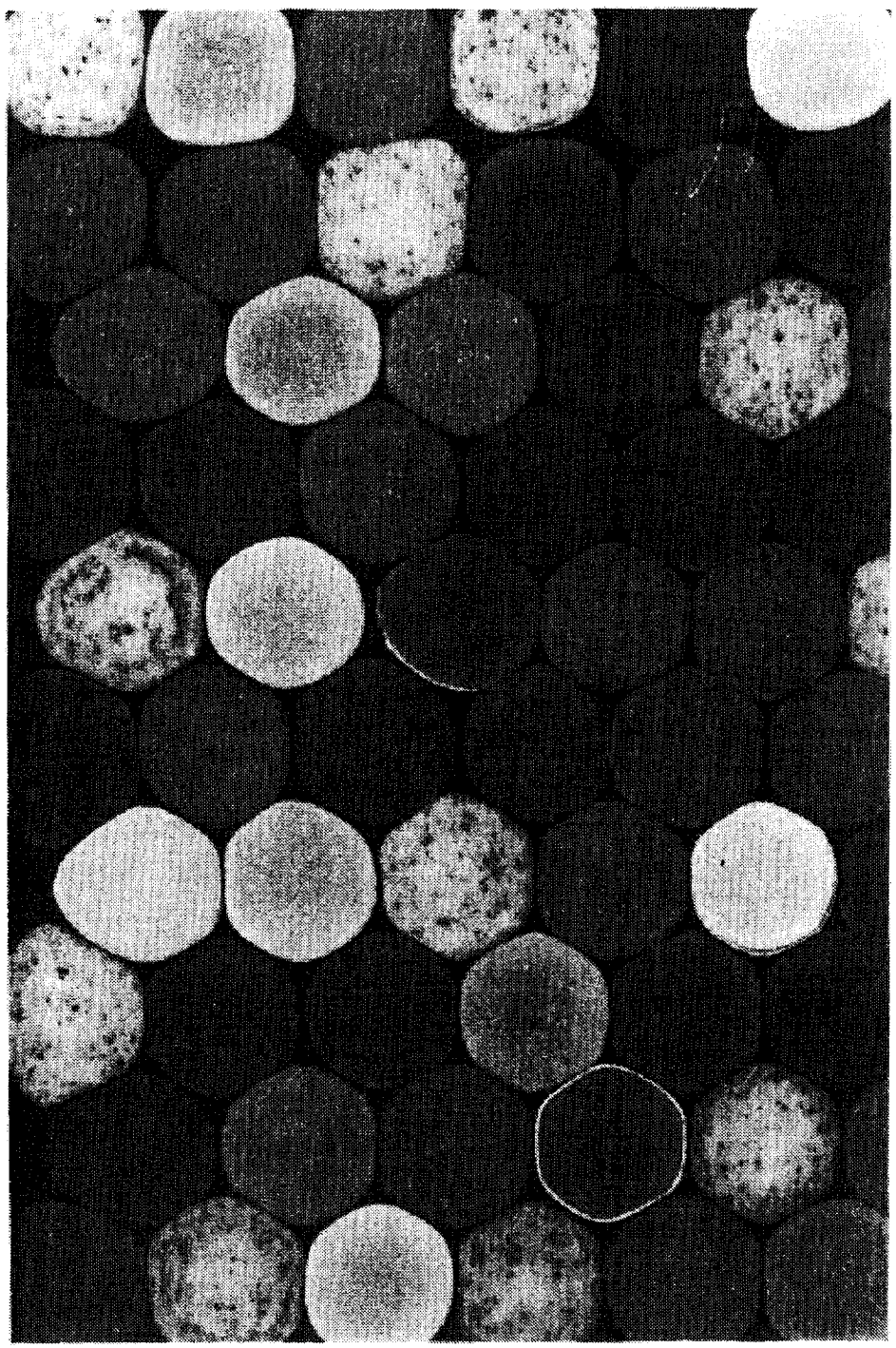
FIG. 13 is a black and white photograph of a surface of a solid surface material having a geometric inclusion pattern.

This example illustrates the fabrications of a pattern of geometric inclusions from a combination of multi-colored, pre-formed cylindrical preformed composite pieces embedded in a black composite powder. A mixture of variously colored composite powders were ram extruded to produce cylindrical preformed composite pieces of material having dimensions of ¾-inch (1.9 cm) in diameter. The cylindrical pieces were cut into sections 0.5 inches long (1.3 cm) and placed in a mold frame 7×7×1 inches (17.8×17.8×2.5-cm). The spaces between the cylinders were filled with black composite powder from Example 20. This was compression molded at 182° C. and 1000 psi (70 kg/cm$^2$) for 10 minutes. The product is shown in FIG. 13. The reverse side of the part exhibited substantially the same pattern. However the edges display a pattern of parallel multi-colored strips corresponding to the cross-section of the cylinders. As shown in FIG. 13, the black composite powder form borders around the cylinder to provide a continuous domain that spans the dimensions of the sample.

Example 26
Different Geometric Tessellated Patterns on Different Surfaces

This example illustrates the fabrication of a regular geometric tessellated pattern of multi-color hexagons from pre-formed porous composite polymeric pieces wherein the top and bottom surfaces of each parallelogram piece is a different color. This example also illustrates that the top, bottom, and edge surfaces of the molded part have different patterns.

Aqueous thixotropic slips were prepared as described in Example 18 from co-dispersions 2-D, 2-F, 2-J, 2-M, 2-N, and 2-P. Composite polymeric flake was prepared from each slip as described in Example 20. Colored composite powders were prepared by crushing the corresponding flake.

A 12-inch×12-inch×1.5-inch (30.5-cm×30.5-cm×3.8-cm) mold was filled with approximately 1250 g of dark brown composite powder (from co-dispersion 2-N), which was carefully leveled. A second thin layer of approximately 150 g white powder (from co-dispersion 2-J) was carefully spread on top of the first and also leveled, being careful not to mix the colors. The mold was closed and heated to 165° C. at 14 psi (1 kg/cm$^2$) for about 10 minutes. These conditions were sufficient to produce a coherent, monolithic panel which could be handled and cut without crumbling, but was still highly porous with approximately 14% voids. The thin layer of partially consolidated white composite powder completely covered one surface of the 12-inch×12-inch×0.44-inch (30.5-cm×30.5-cm×1.1-cm) panel, while the remaining thickness and opposite surface was dark brown. The same procedure was used to prepare two more panels. One panel consisted of a thin blue layer made from co-dispersion 2-D on top of a medium brown layer made from co-dispersion 2-M. The second panel consisted of a thin gray layer made from co-dispersion 2-F on top of an off-white layer made from co-dispersion 2-P.

All three panels were cut with a band saw into pieces in the shape of regular parallelograms 1 inch (2.54 cm) on each side with alternate angles of 60° and 120° C. These pieces were assembled in the mold to create a regular array of alternating colors with the thick colored layers all on one surface. The part was compression molded at 180° C. and 1000 psi (70 kg/cm$^2$) for 20 minutes. The two sides of the resulting product are shown in FIGS. 14A and 14B.

A comparison of the patterns visible on the top, side edge and bottom of this molded part is shown in FIGS. 17A–C. A pattern of parallelograms is visible on the top and bottom surfaces, as shown in FIGS. 17A and 17C, while the colors appear as rectangles on the edge surface, as shown in FIG. 17B.

Example 27
Combination of Mud-Cracked Pattern First Surface and Geometric Tessellated Pattern Second Surface This example illustrates the fabrication of a single monolithic solid surface product incorporating two different pattern motifs: a black and white checker board backed by mud-crack pattern.

A monolithic white panel and a monolithic black panel were prepared from composite powders made from co-dispersions 2-J and 2-K, respectively. 1000 g of the composite powder was compacted in a 12×12 inch mold (30.5×30.5 cm) at 182° C. and 500 psi (35 kg/cm$^2$) for 10 minutes. The resulting panels were approximately 12-inch×12-inch×0.75-inch (30.5-cm×30.5-cm×1.9-cm). Each of these panels was cut into 32 squares 1.27-inch×1.27-inch×0.45-inch (3.2-cm×3.2-cm×1.1-cm). The squares were arranged in an alternating black and white checkerboard pattern in the center of a 12-inch×12-inch (30.5-cm×30.5-cm) molding frame. Two strips of black and white border were cut to form a mitered "picture frame" to surround the checkerboard, so that the mold surface was entirely filled.

An additional red-brown aqueous thixotropic slip was made from 37% latex 1-A, 61.93% ATH, 0.035% red iron oxide pigment and 0.035% yellow iron oxide pigment, to which had been added a few percent of the black and white composite powders to create the appearance of red sandstone. 750 g of this slip (about 57% solids) was spread over the surface of the checkerboard in the mold. The slip was dried in a convection oven at 225° C. for 1.5 hours. The resulting mud-cracks were back-filled with the white composite powder from Example 22. The part was then molded at 182° C. and 1000 psi (70 kg/cm$^2$) for 15 minutes. The checkerboard surface of the part is shown in FIG. 4A. The reverse, mud-crack side of the part is shown in FIG. 4B. The white, black and mud-crack domains had been joined seamlessly, yet the interfaces were clean and very sharply defined with no apparent mixing of the pigmentation.

Example 28
Contoured Surface Incorporating a Mud-Cracked Pattern

This example illustrates the fabrication of a product having a clock face with a contoured surface incorporating a mud-crack pattern, wherein specific features have been differentiated by the use of different colored slips.

Figure 15:
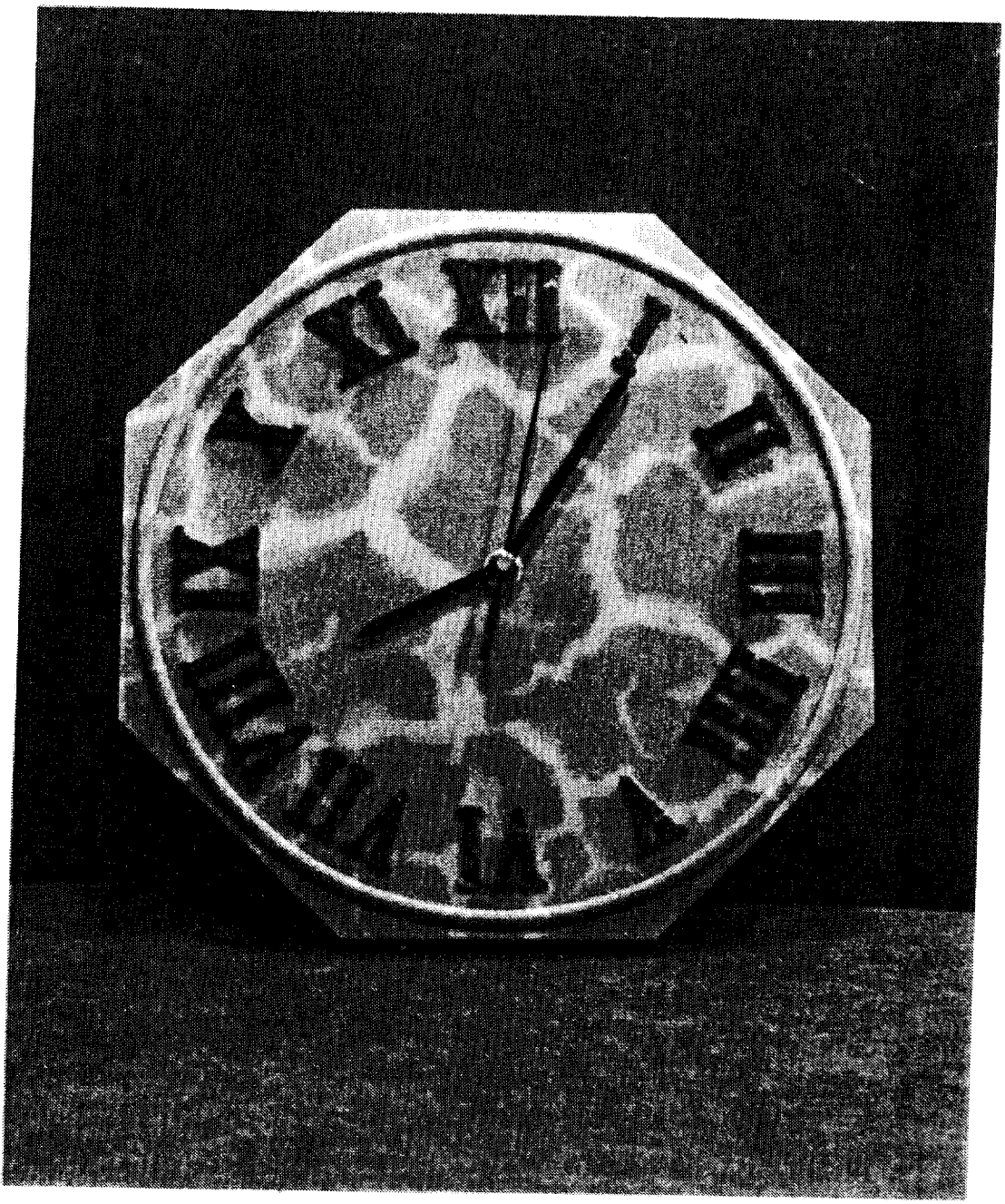
FIG. 15 is a black and white photograph of a surface of a solid surface material having a combination of a clock face design over a mud-cracked pattern background.

The surface of an aluminum plate 12-inch×12-inch×0.75-inch (30.5-cm×30.5-cm×1.9-cm) was milled to form a recessed pattern. The pattern was ⅛-inch deep (0.32 cm) and consisted of a circle 11 inches (27.9 cm) in diameter and ¼-inch (0.64 cm) thick, surrounding a set of Roman numerals placed to represent the hours on a clock face. The plate was placed on the bottom of a 12-inch×12-inch×1.5-inch (30.5-cm×30.5-cm×3.8-cm) mold with the recessed pattern facing up. The recessed area for each Roman numeral was filled with the black aqueous thixotropic slip from Example 23 using a disposable plastic pipette. The entire mold was then filled to a depth of ¾-inch (1.9 cm) with the red-brown aqueous thixotropic slip from Example 27 without the addition of black and white powders. The mold was dried in a convection oven at 225° C. The resulting mud-cracks were back-filled with 364 g of the white composite powder from Example 22. The pusher plate was inserted in the mold and the part was molded at 175° C. and 1000 psi (70 kg/cm²) for 10 minutes. The resulting monolithic product is shown in FIG. 15. The mud-cracked veins were visible in the raised black numerals as well as in the red-brown areas.

Example 29

Natural Vein Pattern

This example illustrates the fabrication of a pattern containing large natural veins.

Figure 16:
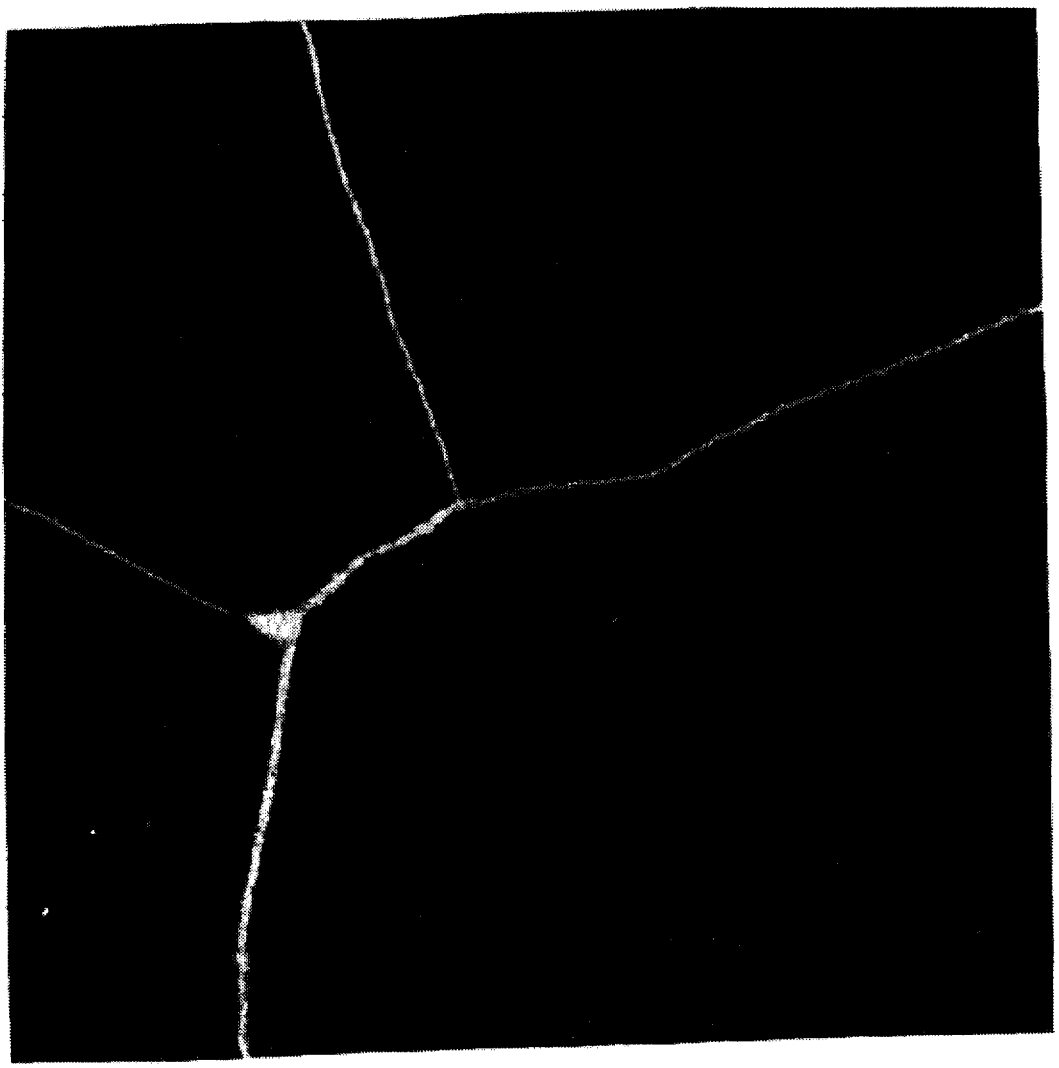
FIG. 16 is a black and white photograph of a surface of a solid surface material having a natural vein pattern.

A dark-brown colored composite powder was prepared by drum-drying an aqueous thixotropic slip made from co-dispersion 2-M. 1948 grams of this powder was spread in a 12×12×1.5 inch (30.5×30.5×3.8 cm) mold and held in a heated press under a load of only 14 psi (1 kg/cm²) at a temperature of 185° C. for 10 minutes. The resulting panel 12×12×0.625 inches (30.5×30.5×1.59 cm) was porous but coherent with a nominal density of 1.32 g/ml, corresponding to 78% of full density. The outer dimensions of the panel were reduced by cutting a ⅛ inch (0.32 cm) strip from two adjoining edges so that the panel fit loosely within the mold. The panel was struck and broken into four irregular pieces by means of a hammer and chisel. The cracks were filled with 38 grams of a white composite powder made from co-dispersion 2-J and molded again at 1000 psi (70 kg/cm²), 185° C. for 10 minutes to produce the final product, 12×12×0.5 inches (30.5×30.5×1.3 cm), which was fully dense. It is shown in FIG. 16.

Example 30

Combination of Predetermined/Superimposed Veins and Natural Mud-Cracked Pattern

This example illustrates the fabrication of a pattern containing a mixture of natural mud-crack veins and veins which follow predetermined geometric shapes.

Figure 18:
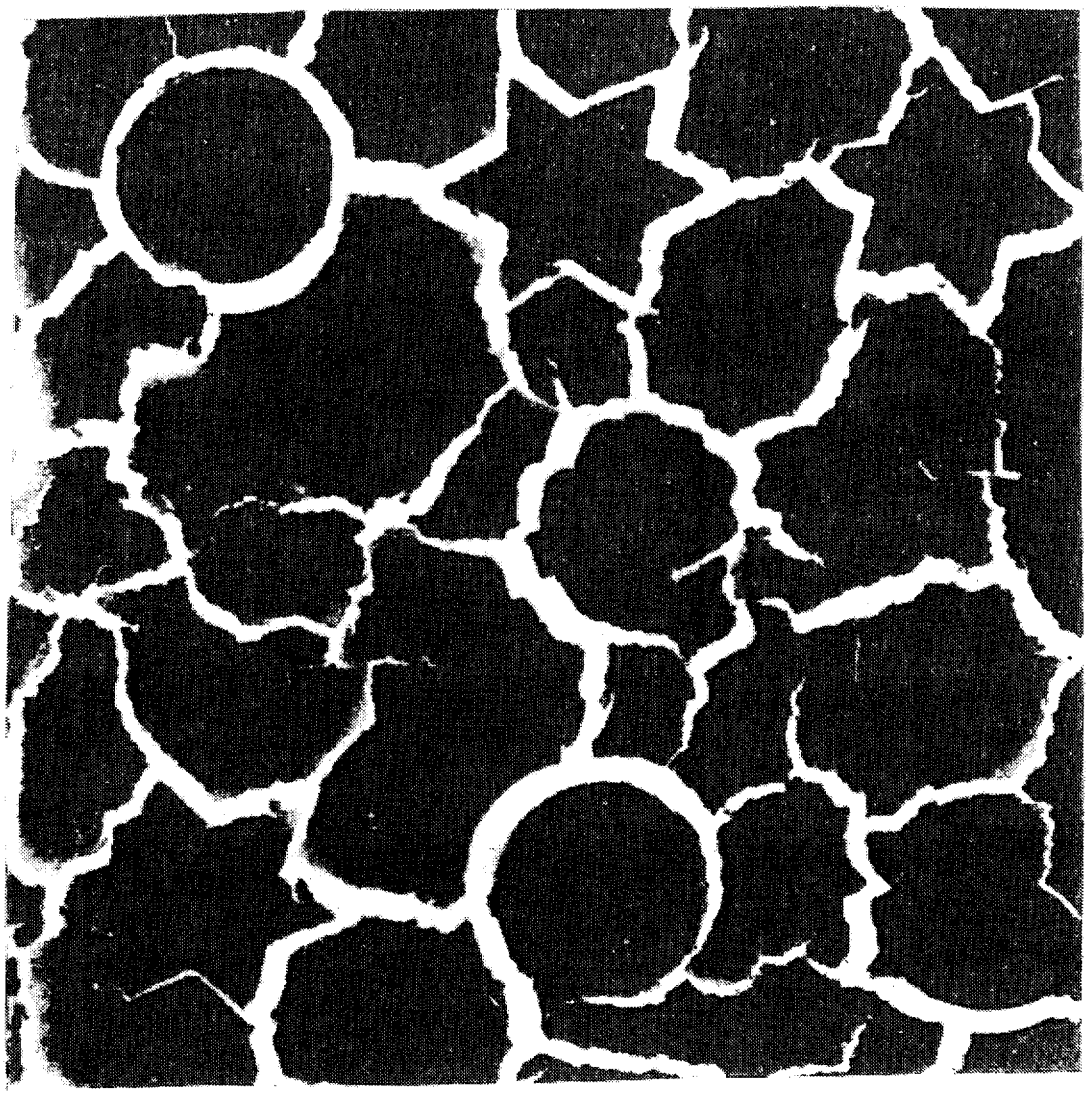
FIG. 18 is a black and white photograph of a surface of a solid surface material having a superimposed/predetermined vein pattern.

3008 grams of an aqueous thixotropic slip containing 36% latex 1A, 62% ATH and 2% pigment was spread into a 12×12×1.5 inch mold (30.5×30.5×3.8 cm). Patterns from 2 to 2.5 inches (5.2 to 6.4) in diameter of a circle, a six-pointed star and a turkey were impressed into the slip using standard tin cookie cutters. The slip was allowed to dry and crack naturally in a convection oven at 107° C. for 2 hours. The cracks were filled with 345 g of white composite powder made from co-dispersion 2-J and the product was compression molded at 1000 psi (70 kg/cm²), 185° C. for 10 minutes. FIG. 18 shows the final product. Since the dimensions of the cookie-cutter patterns are comparable in size to the natural distance between mud-cracks, the cracks are seen to intersect these patterns, but the predetermined shapes are largely intact.

What is claimed is:

1. An aqueous thixotropic slip composition consisting essentially of:

(a) about 20–60% by weight, based on the weight of solids, of at least one thermoplastic polymer having a $T_g$ greater than about 60° C., the at least one thermoplastic polymer in the form of colloidal particles;

(b) about 20–80% by weight, based on the weight of solids, of mineral filler;

(c) up to about 5% by weight, based on the weight of solids, of decorative filler;

(d) up to about 50% by weight, based on the weight of solids, of polymeric particles selected from filled polymeric particles, unfilled polymeric particles, and combinations thereof; and (e) a thickening agent;

wherein the thickening agent is present in an amount sufficient to form a thixotropic combination and wherein said composition is non-film-forming when dried at atmospheric pressure.

2. The composition of claim 1, wherein the colloidal particles have an average latex particle size of less than about 2 microns.

3. The composition of claim 1, wherein the colloidal particles have an average latex particle size of less than about 1 micron.

4. The composition of claim 1, wherein the thermoplastic polymer is a homopolymer or copolymer of acrylic or methacrylic esters.

5. The composition of claim 1, wherein the mineral filler is selected from alumina, silica, alumina trihydrate, calcium carbonate, aluminosilicates, borosilicates, and combinations thereof.

6. The composition of claim 1, wherein the decorative particles are selected from pigments, colorants, reflective particles, and combinations thereof.

7. The composition of claim 1, wherein the polymeric particles comprise the at least one thermoplastic polymer.

8. The composition of claim 1 wherein the thickening agent is a salt.

9. The composition of claim 8 wherein the salt is selected from ammonium acetate, ammonium carbonate, and combinations thereof.

10. The composition of claim 1, comprising about 30–50% by weight, based on the weight of solids, of the at least one thermoplastic polymer and about 50–75% by weight, based on the weight of solids, of the mineral filler.

11. The composition of claim 1, wherein the at least one thermoplastic polymer has a weight average molecular weight of at least 300,000.

\* \* \* \* \*